United States Patent
Kolli et al.

(10) Patent No.: US 11,055,893 B2
(45) Date of Patent: Jul. 6, 2021

(54) REAL-TIME UNREAD INDICATOR

(71) Applicant: Microsoft Technology Licensing, LLC, Redmond, WA (US)

(72) Inventors: Samish Chandra Kolli, San Jose, CA (US); Tomer Cohen, Palo Alto, CA (US); Vivek Yogesh Tripathi, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/853,642

(22) Filed: Dec. 22, 2017

(65) Prior Publication Data

US 2018/0276871 A1   Sep. 27, 2018

Related U.S. Application Data

(60) Provisional application No. 62/477,342, filed on Mar. 27, 2017.

(51) Int. Cl.

| | |
|---|---|
| *G06F 40/106* | (2020.01) |
| *G06T 13/80* | (2011.01) |
| *G06Q 50/00* | (2012.01) |
| *G06Q 10/10* | (2012.01) |
| *G06T 11/00* | (2006.01) |
| *H04L 12/58* | (2006.01) |
| *G06F 40/103* | (2020.01) |
| *G06F 16/901* | (2019.01) |

(52) U.S. Cl.
CPC ............ *G06T 13/80* (2013.01); *G06F 40/103* (2020.01); *G06F 40/106* (2020.01); *G06Q 10/1053* (2013.01); *G06Q 50/01* (2013.01); *G06T 11/001* (2013.01); *H04L 51/32* (2013.01); *G06F 16/9024* (2019.01); *G06T 2200/24* (2013.01); *H04L 51/10* (2013.01); *H04L 51/24* (2013.01)

(58) Field of Classification Search
CPC .......... G06F 16/20; G06F 16/30; G06F 17/20; G06F 17/30; G06F 3/04
See application file for complete search history.

(56) References Cited

U.S. PATENT DOCUMENTS

| | | | |
|---|---|---|---|
| 2008/0082941 A1* | 4/2008 | Goldberg | G06F 3/0482 715/810 |
| 2011/0214086 A1* | 9/2011 | Narayanan | G06F 3/0482 715/784 |
| 2011/0225547 A1* | 9/2011 | Fong | G06F 3/04817 715/835 |

(Continued)

*Primary Examiner* — Sanchita Roy

(74) *Attorney, Agent, or Firm* — Schwegman Lundberg & Woessner, P.A.

(57) ABSTRACT

Systems, devices, media, and methods are presented for identifying unread elements and presentation context to generate real-time indicators for the unread elements. The systems and methods receive an indication identifying a member and identify content for presentation to the member. The systems and methods determine one or more presentation parameters for the content and one or more content parameters for the content. The systems and methods generate a content representation of the content for presentation within a user interface based on the presentation parameters and the content parameters, and cause presentation of the content representation at the client device associated with the member.

19 Claims, 22 Drawing Sheets

(56) References Cited

U.S. PATENT DOCUMENTS

| | | | |
|---|---|---|---|
| 2012/0143948 A1* | 6/2012 | Archambault | H04L 51/32 709/204 |
| 2013/0063443 A1* | 3/2013 | Garside | G06F 3/033 345/473 |
| 2013/0063465 A1* | 3/2013 | Zaman | G06F 3/04883 345/582 |
| 2013/0063490 A1* | 3/2013 | Zaman | G06F 16/168 345/649 |
| 2013/0332523 A1* | 12/2013 | Luu | G06Q 30/0251 709/204 |
| 2014/0189524 A1* | 7/2014 | Murarka | G06Q 50/01 715/744 |
| 2016/0358367 A1* | 12/2016 | Metz | G06F 17/212 |
| 2017/0255681 A1* | 9/2017 | Giunio-Zorkin | G06F 17/30525 |
| 2018/0192142 A1* | 7/2018 | Paul | H04N 21/64738 |
| 2018/0225025 A1* | 8/2018 | Rahnama | G06F 3/0482 |

\* cited by examiner

REAL-TIME UNREAD INDICATOR

RELATED APPLICATIONS

This application claims the priority benefit of U.S. Provisional Application No. 62/477,342, entitled "REAL-TIME UNREAD INDICATOR," filed Mar. 27, 2017, which is hereby incorporated herein by reference in its entirety.

TECHNICAL FIELD

Embodiments of the present disclosure relate generally to the technical field of providing unread indicators. Specifically, the present disclosure describes systems and methods to identify unread elements and presentation context to generate real-time indicators for the unread elements.

BACKGROUND

Network-based publication systems enable users to publish documents, pages, and other content. Users may access and view published content on the network-based publication system via a network linking the network-based publication system to a client device. A social networking system allows members to declare information about themselves, such as their professional qualifications or skills. In addition to information the members declare about themselves, a social networking system may gather and track information pertaining to behaviors of members with respect to the social networking system and social networks of members of the social networking system. Analyzing a vast array of such inform ad on may help to formulate solutions to various problems that may not otherwise have clear solutions.

BRIEF DESCRIPTION OF THE SEVERAL VIEWS OF THE DRAWINGS

Some embodiments are illustrated by way of example and not limitation in the accompanying drawings, in which.

DETAILED DESCRIPTION

Figure 1:
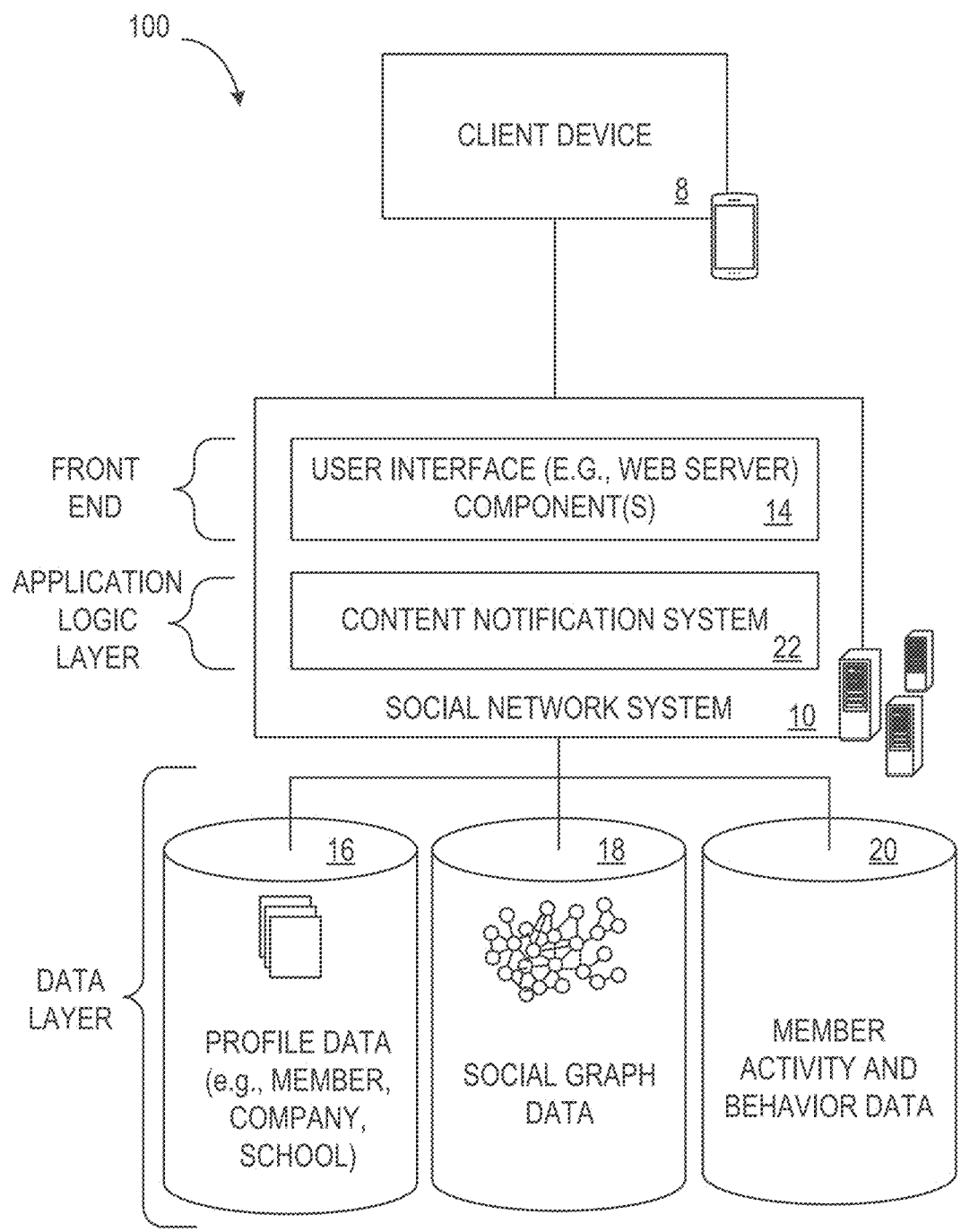
FIG. 1 is a block diagram of the functional components that comprise a computer- or network-based social networking system, including a content notification system, consistent with some embodiments described herein.

Example methods and systems are shown for providing unread indicators. The systems and methods of the present disclosure may incorporate analysis a social network, rankings, and other actions on data sets within a networked system to identify unread elements and presentation context for those elements. In some embodiments, the methods and systems described herein enable identification of unread elements and presentation contexts to generate real-time indicators for the unread elements within the social networking system. In some example embodiments, a first member of a social network logs one or more changes to a data set (e.g., a member profile) in a social networking system. The one or more changes may correspond to a specified element or element type, such as a job or employment status. A network analysis machine may generate real-time unread indicators indicating newly generated or presented elements displayed according to a presentation context of a client device.

Social networking systems provide various profile options and services. In some instances, a social network may connect members (e.g., individuals associated with the social network) and organizations alike. Social networking services have also become a popular method of performing organizational research and job searching. Job listings representing openings (e.g., employment and volunteer positions) within an organization may be posted and administered by the organization or third parties (e.g., recruiters, employment agencies, etc.).

A social networking system may have a vast array of information pertaining to members of the social networking system, companies maintaining a social networking presence on the social networking system, and interactions between members, companies, and content provided by both the members and the companies to the social networking system. As will be discussed in more detail below, information pertaining to members of the social networking system can include data items pertaining to education, work experience, skills, reputation, certifications, and other qualifications of each of the members of the social networking system at particular points during the careers of these members, or interaction data indicating a history of interactions with content on the social networking system. This information pertaining to members of the social networking system may be member-generated to enable individualization of social networking profiles as well as to enable dynamic and organic expansion and discovery of fields of experience, education, skills, and other information relating to personal and professional experiences of members of the social networking system.

In some embodiments, members of a social networking system are presented with content (e.g., posts, articles, reactions, messages, etc.) from other members and third-parties alike. Such content may be organized into categories, threads, or other groupings which indicate similar topics or information, indicate an ongoing conversation, or indicate other interrelations among the content or the members responsible for the content. A member may initially be presented with a set of content, such as a group of articles or messages on a topic. The member may view or interact with the set of content or a portion thereof. An unread indicator may be a graphical element or other representation informing a user that new content, which has not previously been viewed, is available to the member. A real-time unread indicator may provide a time sensitive or time-based representation of new or unread content. In some instances, the real-time unread indicator continuously or periodically identifies new content and provides a graphical element representing newly received or available content as or soon after the content has been generated.

Previous systems provide a small dot to represent unread content. Such a dot is often only presented in response to an update request generated by a user. The systems and methods of the present disclosure enable a contextual unread indicator updated in real time, based on characteristics of the device on which the unread indicator is to be presented, network and other communications characteristics, and member-based considerations. In some embodiments, the real-time unread indicator determines a suitable representation based on constraints of a display device and a network over which the content is to be transmitted. Such a contextually based real-time unread indicator may dynamically adjust to constraints corresponding to the presenting device and the communications network and provide an indication more likely to be identified by a member.

Other aspects of the present inventive subject matter will be readily apparent from the description of the figures that follow.

FIG. 1 is a block diagram 100 of the functional components that comprise a computer or network-based social network system 10, consistent with some embodiments of the inventive concepts of the present disclosure. In some embodiments, the social network system 10 acts as a network-based publication system. In these instances, as shown in FIG. 1, the social network system 10 is generally based on a three-tiered architecture, comprising a front-end layer, application logic layer, and data layer. As is understood by skilled artisans in the relevant computer and Internet-related arts, each component or engine shown in FIG. 1 represents a set of executable software instructions (e.g., an instruction set executable by a processor) and the corresponding hardware (e.g., memory and processor) for executing the instructions. To avoid obscuring the inventive subject matter, various functional components and engines that are not germane to conveying an understanding of the inventive subject matter have been omitted from FIG. 1. However, a skilled artisan will readily recognize that various additional functional components and engines may be used with a social networking system 10, such as that illustrated in FIG. 1, to facilitate additional functionality that is not specifically described herein. Furthermore, the various functional components and engines depicted in FIG. 1 may reside on a single server computer, or may be distributed across several server computers in various arrangements. Moreover, although the social networking system 10 is depicted in FIG. 1 as having a three-tiered architecture, the inventive subject matter is by no means limited to such an architecture.

As shown in FIG. 1, the front end comprises a user interface component 14 (e.g., a web server), which receives requests from various client devices 8, and communicates appropriate responses to the requesting client devices 8. For example, the user interface component 14 may receive requests in the form of Hypertext Transfer Protocol (HTTP) requests or other web-based application programming interface (API) requests. The client devices 8 may be executing conventional web browser applications or applications that have been developed for a specific platform to include any of a wide variety of mobile devices and operating systems.

As shown in FIG. 1, the data layer includes several databases, including one or more databases 16 for storing data relating to various entities represented in a social graph. In some embodiments, these entities include members, companies, and/or educational institutions, among possible others. Consistent with some embodiments, when a person initially registers to become a member of the social networking service, and at various times subsequent to initially registering, the person will be prompted to provide some personal information, such as his or her name, age (e.g., birth date), gender, interests, contact information, home town, address, spouse's and/or family members' names, educational background (e.g., schools, majors, etc.), current job title, job description, industry, employment history, skills, professional organizations, and so on. This information is stored as part of a member's member profile, for example, in the database 16. In some embodiments, a member's profile data will include not only the explicitly provided data, but also any number of derived or computed member profile attributes and/or characteristics.

Once registered, a member may invite other members, or be invited by other members, to connect via the social networking service. A "connection" may mean a bilateral agreement by the members, such that both members acknowledge the establishment of the connection. Similarly, in some embodiments, a member may elect to "follow" another member. In contrast to establishing a "connection," the act of "following" another member typically is a unilateral operation and, at least in some embodiments, does not include acknowledgement or approval by, the member who is being followed. When one member follows another, the member who is following may receive automatic notifications about various activities undertaken by the member being followed. In addition to following another member, a member may elect to follow a company, a topic, a conversation, or some other entity. In general, the associations and relationships that a member has with other members and other entities (e.g., companies, schools, etc.) become part of the social graph data maintained in a database 18. In some embodiments, a social graph data structure may be implemented with a graph database (e.g., the database 18), which is a particular type of database that uses graph structures with nodes, edges, and properties to represent and store data. In this case, the social graph data stored in the database 18 reflects the various entities that are part of the social graph, as well as how those entities are related with one another.

In various alternative embodiments, any number of other entities might be included in the social graph and, as such, various other databases may be used to store data corresponding with the other entities. For example, although they are not shown in FIG. 1, consistent with some embodiments, the social networking system 10 may include additional databases for storing information relating to a wide variety of entities, such as information concerning various online or offline groups, job listings or postings, photographs, audio or video files, and so forth.

In some embodiments, the social networking service may include one or more activity and/or event-tracking components, which generally detect various member-related activities and/or events, and then store information relating to those activities/events in a database 20. For example, the tracking components may identify when a member makes a change to some attribute of his or her member profile or adds a new attribute. Additionally, a tracking component may detect the interactions that a member has with different types of content. Such information ma be used, for example, by one or more recommendation engines to tailor the content presented to a particular member, and generally to tailor the member experience for a particular member.

The application logic layer includes various application server components, which, in conjunction with the user interface component 14, generate various user interfaces (e.g., web pages) with data retrieved from various data sources in the data layer. In some embodiments, individual application server components are used to implement the functionality associated with various applications, services, and features of the social networking service. For instance, a messaging application, such as an email application, an instant messaging application, a social networking application native to a mobile device, a social networking application installed on a mobile device, or some hybrid or variation of these, may be implemented with one or more application server components implemented as a combination of hardware and software elements. Of course, other applications or services may be separately embodied in their own application server components.

As shown in FIG. 1, a content notification system 22 is an example application server component of the social networking system 10. The content notification system 22 performs operations to generate unread indicators representing newly generated elements of content for presentation within a client device. In some embodiments, the content notification system 22 operates in conjunction with the user interface components 14 to receive sets of publication data, sets of member data, and member input to generate tailored user interface presentations including indicators for newly generated or received content. For example, the content notification system 22 may render graphical representations of content with motion-based display animations according to a presentation context of a client device in real time or near real time.

The social networking system 10 may provide a broad range of applications and services that allow members the opportunity to share and receive information, often customized to the interests of the member. For example, in some embodiments, the social networking system 10 may include a photo sharing application that allows members to upload and share photos with other members, or a slide sharing application, which allows members to upload slide decks for sharing among other members. In some embodiments, members of the social networking system 10 may be able to self-organize into groups, or interest groups, organized around a subject or topic of interest. Accordingly, the data for a group may be stored in a database (not shown). When a member joins a group, his or her membership in the group will be reflected in the social graph data stored in the database 18. In some embodiments, members may subscribe to or join groups affiliated with one or more companies. For instance, in some embodiments, members of the social networking system 10 may indicate an affiliation with a company at which they are employed, such that news and events pertaining to the company are automatically communicated to the members. In some embodiments, members may be allowed to subscribe to receive information concerning companies other than the company with which they are employed. Here again, membership in a group, a subscription or following relationship with a company or group, and an employment relationship with a company are all examples of the different types of relationships that may exist between different entities, as defined by the social graph and modeled with the social graph data of the database 18.

Figure 2:
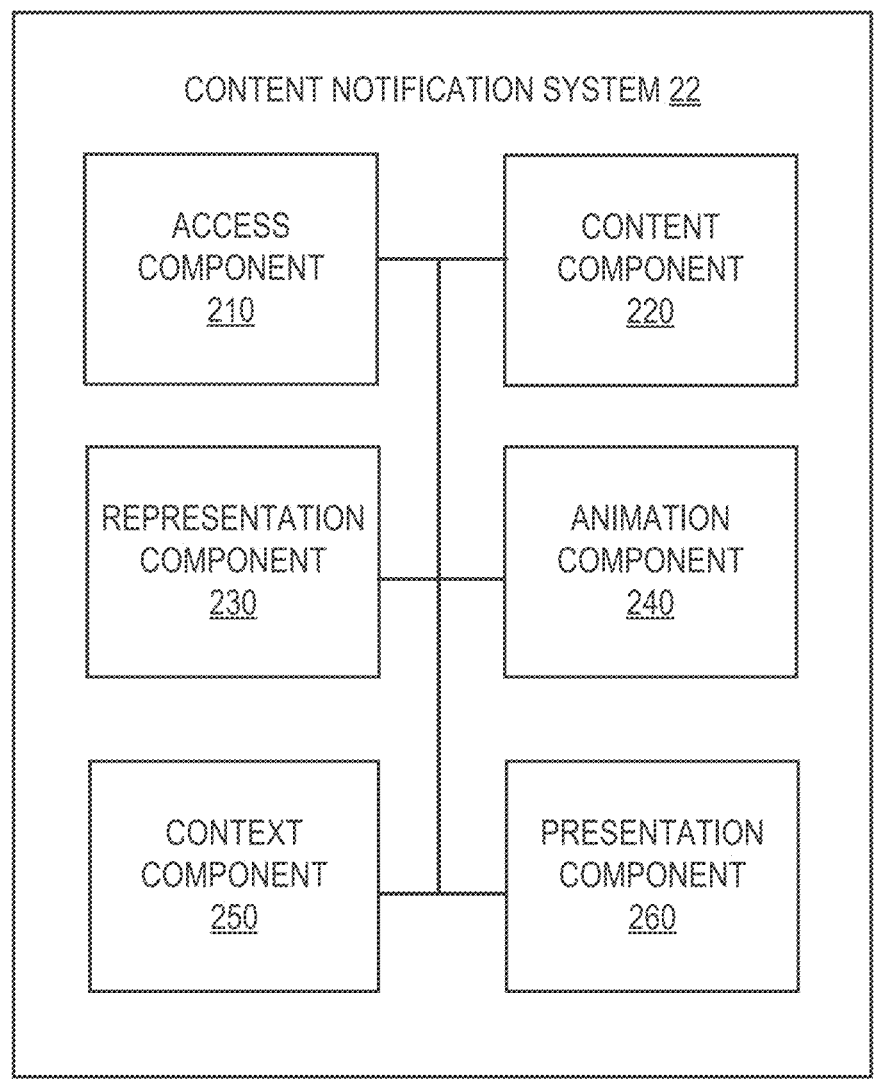
FIG. 2 is a block diagram depicting components of the content notification system of FIG. 1, in accordance with an example embodiment.

FIG. 2 is a block diagram 200 depicting some example components of the content notification system 22 of FIG. 1. The content notification system 22 is shown including an access component 210, a content component 220, a representation component 230, an animation component 240, a context component 250, and a presentation component 260, all configured to communicate with each other (e.g., via a bus, shared memory, a switch, or a network). Any one or more of the components described herein may be implemented using hardware (e.g., one or more processors specifically configured to perform the operations described herein) or a combination of hardware and software, forming a hardware-software implemented component. For example, any component described herein may configure a processor (e.g., among one or more processors of a machine) as a special-purpose machine, during the pendency of a set of operations, to perform the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

Figure 3:
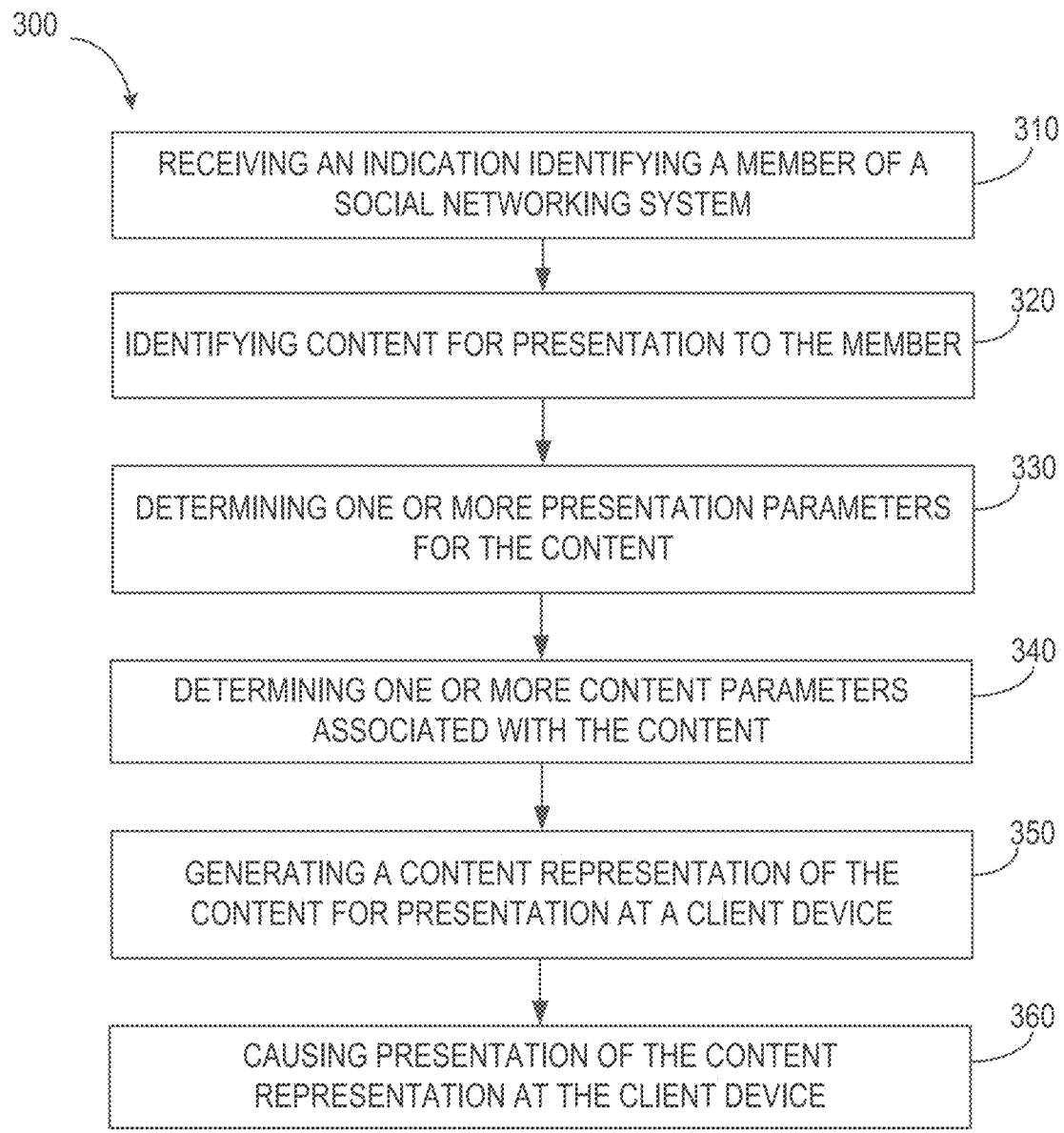
FIG. 3 is a flow diagram illustrating a method of generating real-time unread indicators, according to some embodiments of the present disclosure.
Figure 4A:
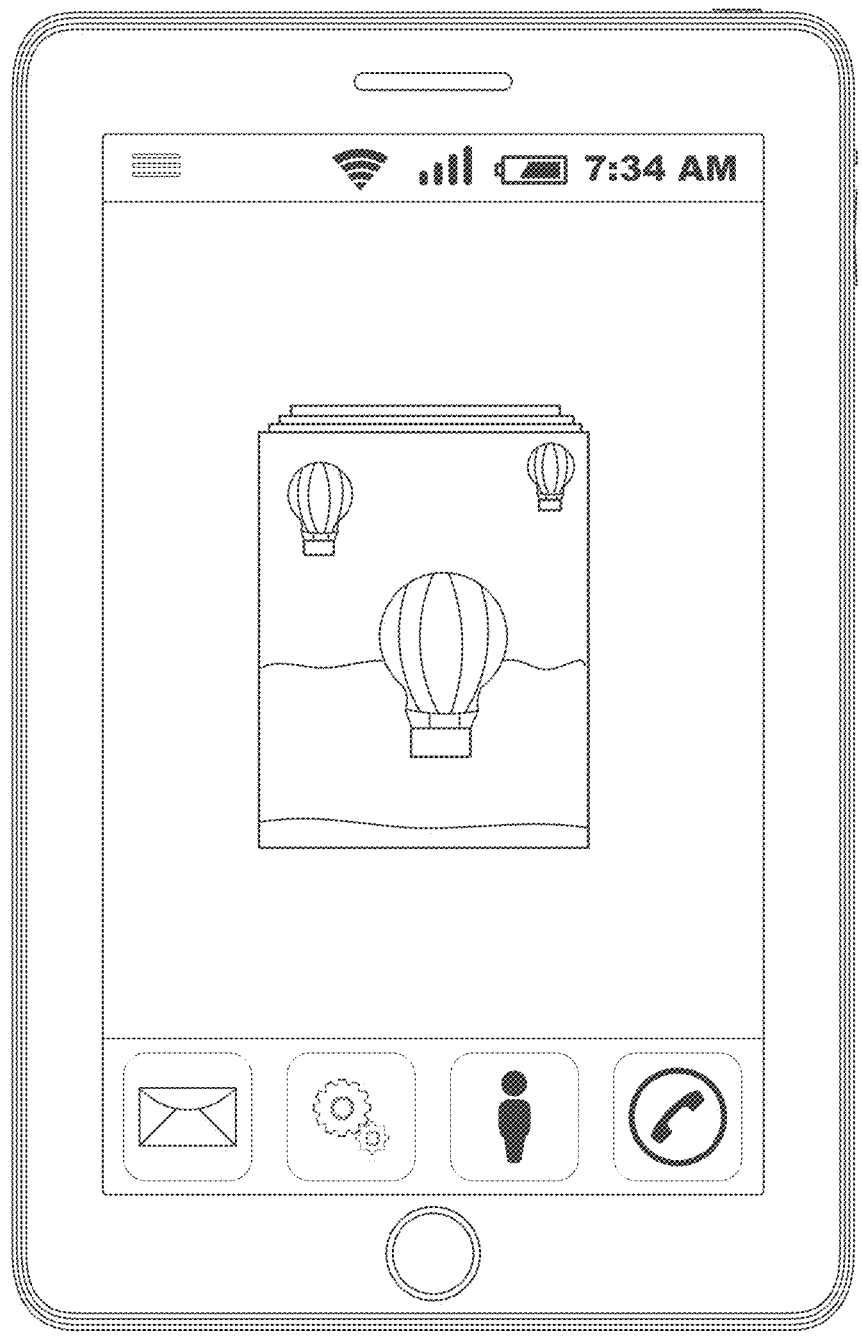
FIG. 4A is a user interface diagram depicting an animation of an unread indicator, according to some example embodiments.
Figure 4B:
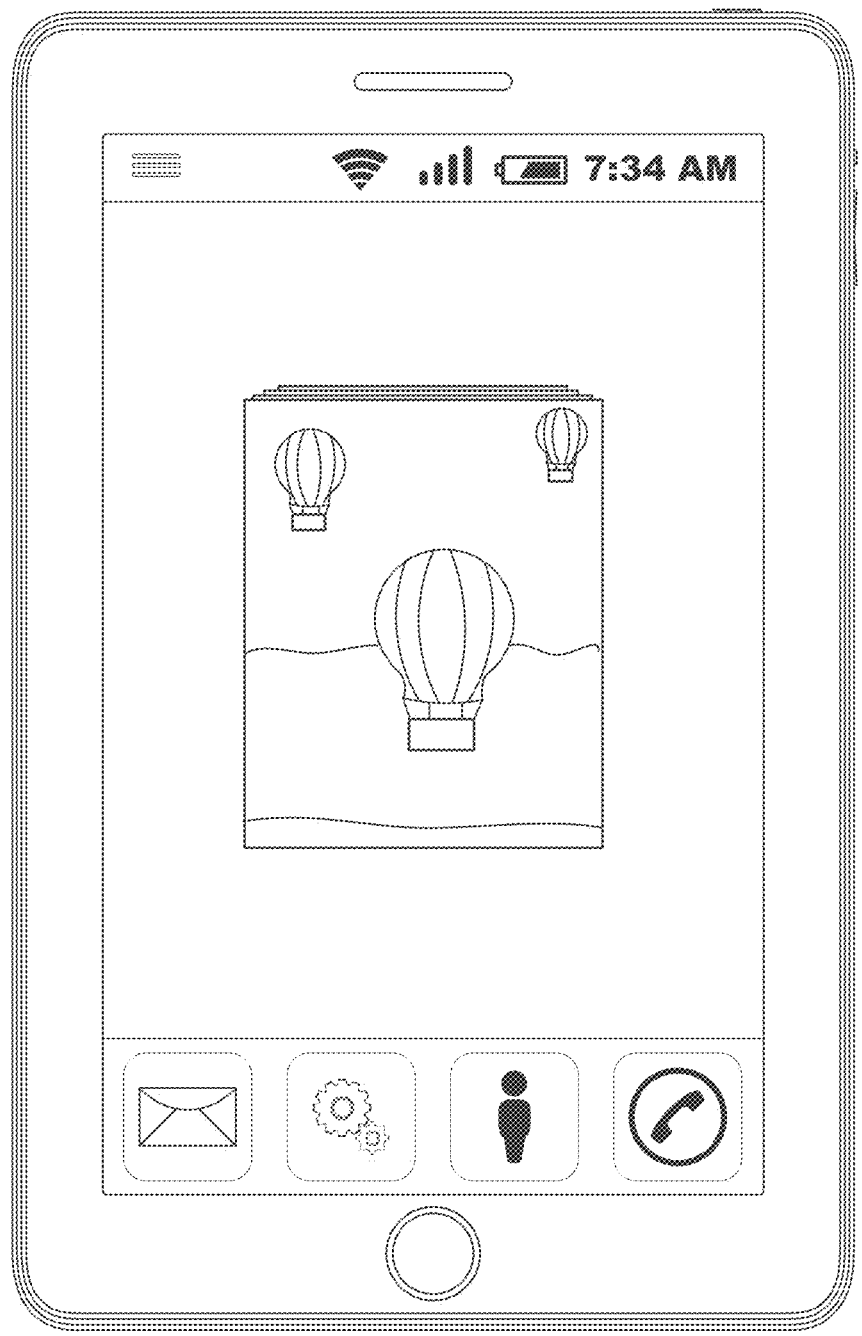
FIG. 4B is a user interface diagram depicting an animation of the unread indicator of FIG. 4A, according to some example embodiments.
Figure 4C:
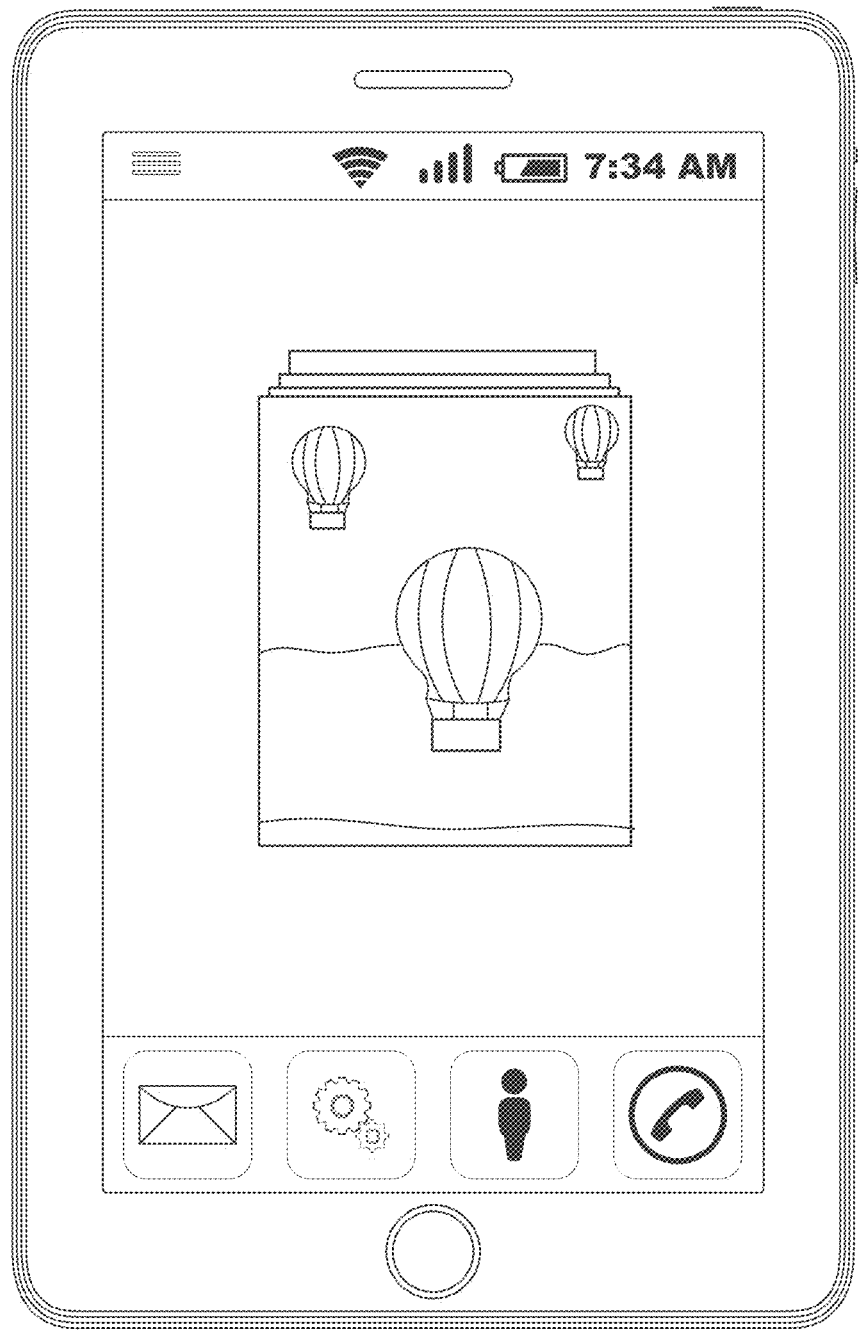
FIG. 4C is a user interface diagram depicting an animation of the unread indicator of FIG. 4A, according to some example embodiments.
Figure 4D:
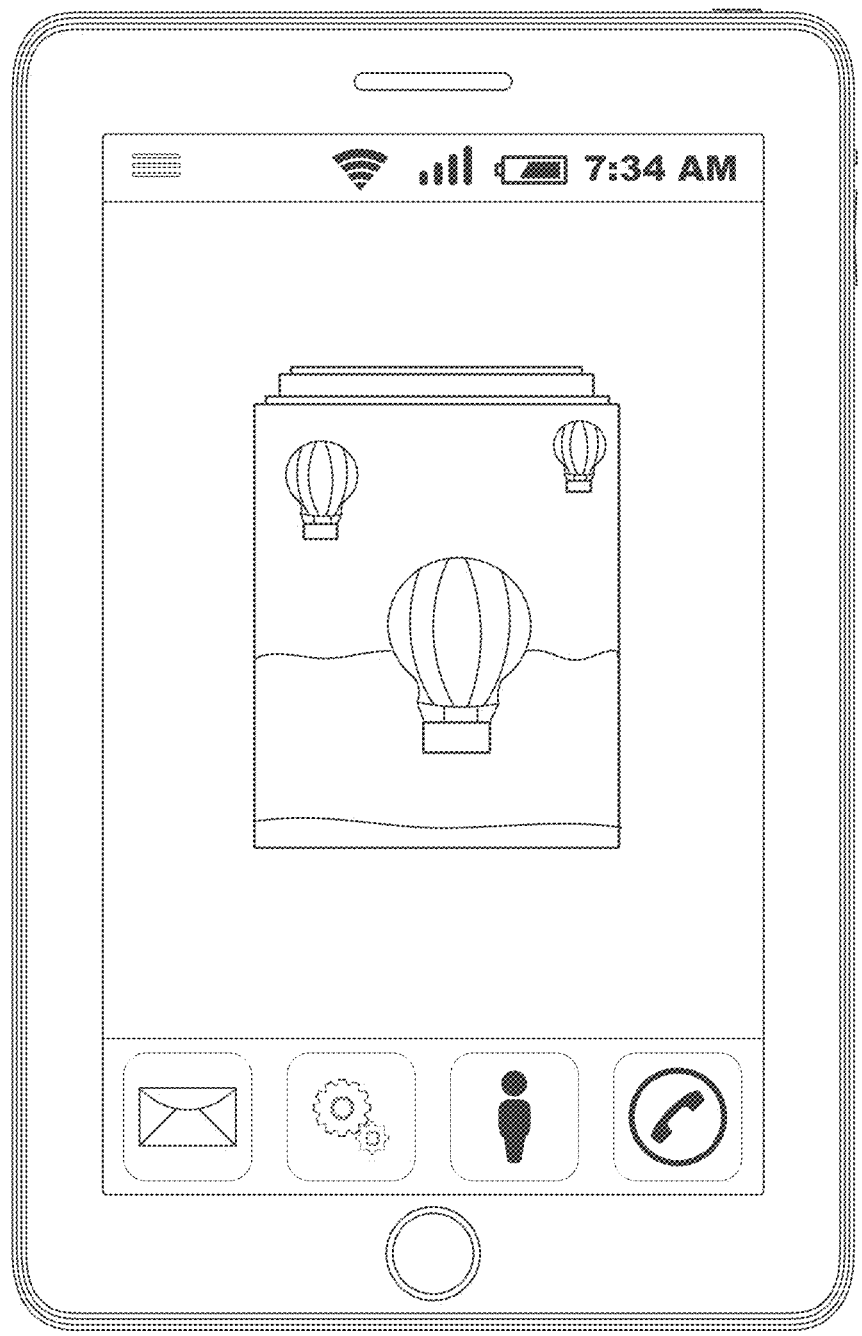
FIG. 4D is a user interface diagram depicting an animation of the unread indicator of FIG. 4A, according to some example embodiments.

FIG. 3 is a flow diagram illustrating an example method 300 of identifying unread elements and presentation context to generate real-time indicators for the unread elements, consistent with various embodiments described herein. For example, the method 300 may comprise identifying newly generated content, identifying presentation contexts of a client device, generating representations of the new content, and presenting the representations according to at least a portion of the presentation contexts. The method 300 may be performed, at least in part, by, for example, the content notification system 22 illustrated in FIG. 2 (or an apparatus having similar components or operative programming, such as one or more client machines or application servers).

In operation 310, the access component 210 receives an indication identifying a member of the social networking system 10. The indication may identify the member and a client device associated with the member. In some embodiments, the indication comprises one or more of member login credentials, an identification for the member, an IP address associated with the member, a machine identifier or address, location information, time information, combinations thereof, or any other suitable information identifying a member and associating the member with a member profile within the social networking system 10. In some embodiments, the content notification system 22 receives the indication, member identification, or member credentials in response to the member logging into the social networking system 10. The content notification system 22 may also receive the indication, member identification, or member credentials in response to the member opening a browser or application having access to the indication, member identification, or member credentials from a previous session in which the member logged into the social networking system 10. For example, where the member saved a user name and password in a browser or application, or instructed the same to remember login credentials or maintain an active session, the browser or application may store or obtain access to a persistent version of the member information. When the member accesses the browser or application after a period of inactivity, the browser or application may retrieve the member information and pass the indication, member identification, or member credentials to the content notification system 22.

In operation 320, the content component 220 identifies content for presentation to the member at the client device. The content may be new content received or identified by the content notification system 22 which is to be presented to the member within a graphical user interface displayed at the client device. In some embodiments, the new content is one or more content elements which have not previously been presented to the member at a user interface of the browser, application, social networking system 10, or client device. Content elements may include posts, comments, articles, pictures, or other information communicated via the social networking system 10 or other communications network. In some instances, the content notification system 22 determines one or more content characteristics associated with the new content. The one or more content characteristics may represent a substance of the content, a graphical representation or depiction of the content, one or more images associated with the content, one or more links associated with the content, one or more members associated with the content, one or more entities associated with the content, combinations thereof, or any other suitable characteristics, attributes, or aspects of the new content.

In some embodiments, the content characteristics indicate an association, a dependency, or any other relationship between the new content and old content (e.g., content previously presented to the member). The relationship between the new content and the old content indicates an update, where the new content corresponds to new information layered into or over the old content. The relationship may also indicate replacement of the old content, commenting on the old content, or otherwise modifying the old content or presentation thereof. In some instances, the relationship indicates commonality or similarity of an aspect or characteristic of the new content and an aspect or characteristic, of the old content. For example, the new content may have a subject similar to or the same as that of the old content.

In some embodiments, the content may be identified using one or more operations or sub-operations comprising operation 320. The content component 220 may identify a first set of content presented at the client device at a first time. For example, once the access component 210 receives the indication representing the member interacting with the browser, application, or social networking system 10, the content component 220 determines content previously presented at a graphical user interface of the browser, application, or social networking system 10, or a client device (e.g., a computing device or mobile computing device) associated with the member. The first set of content may be content that was previously presented at the client device in a prior communication session. The content component 220 may identify content characteristics or attributes associated with the first set of content.

A second set of content may then be identified which is available for presentation at the client device. The second set of content may be distinct from the first set of content, based at least on a time the second set of content became available for distribution. The content component 220 may then select a portion of content of the second set of content as the content for presentation at the client device. In some embodiments, at least one attribute, characteristic, or category of the portion of content corresponds to a similar attribute, characteristic, or category of the first set of content. For example, where the first set of content shares a common category, such as "hot air ballooning," the content component 220 may select the portion of content of the second set of content which is associated with or related to the common category.

In some embodiments, the content component 220 determines previously presented content periodically during an active session for the member. For example, the content component 220 may determine the previously presented content at periodic intervals (e.g., predetermined or dynamically determined intervals). The periodic intervals may be time-based intervals, such as hourly intervals, half hour intervals, five minute intervals, thirty second intervals, or real time or near real time intervals. The periodic intervals may be event-driven intervals. Such event-driven intervals may reflect specified actions, interactions, operations, instances, effects, or triggers of the browser, application, social networking system 10, client device, or member. For example, an event-driven interval may reflect selection of a user interface element, such as a "Back" button. Upon selection of the back button, the content component 220 may determine previously presented content, including content from which the member is navigating away.

In some embodiments, the content component 220 determines previously presented content from content elements previously loaded, transmitted to the client device, or previously present within a graphical user interface of the client device. The determination of previously presented content may be based on content presentation in a previous session or a current session. In some instances, the content component 220 determines that the content elements have all been previously presented. In such instances, the presentation component 260 may present the content items without animations, as explained in more detail below. In real time or near real time, the content component 220 receives a content indication from the social networking system 10 or a client device of another member of the social networking system 10. The content indication may comprise, indicate, or otherwise represent one or more new content items to be presented within the graphical user interface of the client device. The new content items may be related to a content type, subject, topic, category, item, or post currently presented, or the new content items may be unrelated to a previously presented content item. Where the new content item is related to a previously presented content item, receipt of the content indication causes the content component 220 to push the new content from the server (e.g., immediately, with a specified delay, or according to an update rule) to the client device.

In operation 330, the context component 250 determines one or more presentation parameters for the content to be presented. In some embodiments, in generating the representation of the new content, the context component 250 determines a presentation context for the new content. The presentation context may represent one or more presentation parameters, characteristics, attributes, or other pieces of information relevant to presenting the new content within a graphical user interface of one or more of the browser, the application, the social networking system 10, or the client device. Presentation parameters may include visual parameters, device parameters, communication parameters, communication service provider parameters, software parameters, combinations thereof, or any other suitable parameters. In some instances, the presentation parameters include one or more of a time of day, a location, a user interest in a topic, a user specific context, a battery status of the client device, a specification context of the client device, a movement of the client device (e.g., a relative movement or an absolute movement), a network connection, a data usage context, an accessibility option, and other suitable pieces of information relating to aspects of presenting the new content to the member. In some embodiments, the presentation context includes a point at which a user last terminated content presentation (e.g., a last viewed content item). The context component 250 may then present new content from the point at which the user previously terminated the session, ceased viewing new content, or generally left off in presentation of a series of new content items.

Where battery status is considered in the presentation parameters, the context component 250 may turn off or preclude a motion-based display animation for representations of new content once a battery status, charge, or power level is below a predetermined or dynamically determined threshold. Further, the context component 250 may determine that a low-power status, low-power mode, or power-saving option has been selected. In response to determining that a low-power mode has been selected, the context component 250 may preclude use of one or more motion-based display animations or all motion-based display animations for presentation of the new content representations.

Where the specification context of the client device is considered in the presentation parameters, the context component 250 may identify one or more technical specifications, hardware specifications, software or firmware specifications, or other device-related aspects for the client device. For example, the context component 250 may determine a mobile telephone model for the client device and determine whether one or more of a memory, a processor capacity, and an operating system are suitable, capable, or otherwise configured to present representations using motion-based display animations. In some embodiments, the context component 250 selects, from a plurality of motion-based display animations, one or more animations configured to be or capable of being properly presented on a user interface of the client device based on device specifications. The context component 250 may then use a specified animation, described in more detail below, of one or more selected animations to present the representations of the new content.

Where movement of the client device is detected and considered in the presentation parameters, the context component 250 may identify a type of motion of the client device. For example, the context component 250 may determine whether the motion of the client device is an absolute movement (e.g., moving between two locations) or a relative movement (e.g., shaking, bouncing, or rotating). Absolute movement may be determined based on one or more of a accelerometer or other device-based sensor, in comparison to a GPS signal or location, a triangulated position, or any other suitable information indicating a location of the device. The absolute movement may indicate a change of geographic position of the device, while a relative movement may indicate motion of the client device without a change in geographic position. The context component 250 may select one or more animations from a plurality of motion-based display animations which are capable of being discerned through or despite the movement of the client device. For example, where the client device has a relative movement indicating shaking or trembling, the context component 250 may select a motion-based display animation appearing as a shimmer, a color change, or a spin or rotation of the representations and may forego motion-based display animations such as a subtle wave or a shaking motion of the representations.

Where an accessibility option, such as color variations compensating for colorblindness, is detected and considered, the context component 250 may adjust visual options to accommodate the accessibility option. For example, the context component 250 may adjust colors for second or subsequent representations to present the representations using a color value within a spectrum or range of colors used by the accessibility option In operation 340, the context component 250 determines one or more content parameters associated with the content to be presented. In some embodiments, the content parameters include one or more of an image, a graphical representation, a set of colors, a primary or prevalent color, a set of aspects, a set of characteristics, one or more categories, metadata, and any other suitable information. For example, a content parameter may be selected as an image accompanying an article or other content.

In some embodiments, the context component 250 determines the one or more content parameters by identifying a set of content characteristics for the content to be presented at the client device. The context component 250 then selects at least one content parameter from a set of content parameters. The selected content parameter or content parameters may be based on at least one content characteristic of the set of content characteristics. For example, a content parameter may be a color or colors depicted within the content or an image representing the content. The content parameter (e.g., the color) may be a dominant color of an image representing the content. The context component 250 may identify a plurality of colors within the image of the content. The context component 250 may then determine a relative amount (e.g., a surface or pixel area) of each color within the image. The context component 250 may then select a color, corresponding to a largest amount, as the dominant color of the image. In some instances, the context component 250 determines the dominant color based on a measure or determination of prominence of the color. The context component 250 may then select the dominant color and the image representing the content as the one or more content parameters.

In operation 350, the representation component 230 generates a content representation of the content for presentation at the client device. In some embodiments, the content representation is generated based on the one or more presentation parameters and the one or more content parameters. The content representation may comprise graphical elements (e.g., images, colors, text) or animated graphical elements (e.g., .GIFs, video clips, or other animations) or both. Upon receipt of the new content items, the representation component 230 may generate a representation for the post containing new content (e.g., the content representation), push the representation and the new content or a link thereto to the client device, and cause presentation of the new content item using an animation. In this way, the content notification system 22 may engage in a real-time or near real-time relevancy determination and presentation of content based on additional content being generated. Example motion-based or animated content representations are shown in FIGS. 4A-4D, 5A-5F, and 6A-6F.

In some embodiments, the content representation of the new content is a graphical representation corresponding to one or more of a type of content (e.g., are article, a comment, a job posting, or a status change), a category, a topic, a subject, an author, an image, or any other suitable information relating to the new content. In some instances, the graphical representation for a new content item is an image. The image may be selected from one or more images within or associated with the new content, or may be received or otherwise provided for use as the representation of the new content item. The new content may comprise a set of new content items, such as a plurality of two or more new content items. In such instances, the representation component 230 may generate representations (e.g., a set of representations) for a portion of the set of new content items. The set of representations may correspond to two or more of the new content items. For example, a first representation for a first new content item may be generated as or including an image relating to a subject of the first new content item. A second representation for a second new content item may be generated as a partial image or a color coordinated border positioned such that at least a portion of the second representation is obscured by the first representation.

In some embodiments, where the first representation is an image and the second representation is a color-coordinated border, a color of the color-coordinated border is selected to correspond to at least one color depicted within the image of the first representation. The at least one color depicted within the image may be a content parameter identified in operation 340. In such embodiments, the representation component 230 identifies a color within the image of the first representation or the image representing the content. The color may be the dominant color, as described above.

Once the dominant color is determined, the representation component 230 may select one or more colors (e.g., a color range, a color and corresponding shade variations, or a color family or palette) corresponding to the dominant color for the second representation. In some instances, the selected colors are shades, gradations, or variations of the dominant color. The selected colors may also be complementary colors to the dominant color. In some instances, the selected colors are determined based on a contrast value between the dominant color and the selected colors.

The representation component 230 may generate the second representation, and other subsequent representations, as selected colors to save bandwidth, data, battery life, and processing cycles, instead of identifying and rendering or otherwise generating an image for the second or subsequent representations. The representation component 230 may select the color-based representations based on the presentation parameter determined above in operation 330. In such embodiments, the subsequent representations may form a stack (e.g., a stack of cards) indicating additional content for a member or user without fully loading the additional content. Further analysis of images or loading of images may be of little interest to the user, and the representation component 230 may save data, bandwidth, battery life, and processing cycles, according to the presentation parameter of operation 330, by generating complementary representations for hidden or partially hidden cards within a stack without prior determination of whether a member may be interested in the content, a specific content element, or a topic. Further, this identification, rendering, and generation process may avoid, preclude, or limit effects of a bottleneck in a network, easing network traffic In operation 360, the presentation component 260 causes presentation of the content representation at the client device associated with the member. In presenting the representation, the presentation component 260 may render the representations within a graphical user interface of a client device of a member based on the presentation parameters and content parameters. Presentation of the content representation may be performed using a suitable motion-based display animation (e.g., the content representation), as described in more detail below. For example, if a member posts a new topic or a response to a previously presented topic, the content notification system 22 may retrieve the content representation or generate a content representation, push the content representation to the client device, and cause presentation of the content representation. In some instances, an underlying representation or display may not change, upon receipt of the new content item or indication thereof. In such instances, the presentation component 260 may cause the motion-based display animation to initiate within the graphical user interface of the client device, indicating new content to view, without changing the previously presented or underlying display.

In some instances, content representations are presented using one or more motion-based display animations. The motion-based display animations may be available for presenting the representations. The motion-based display animations may be selected at a time of presentation (e.g., at or during operation 360). The motion-based display animations may also be selected prior to presentation of the representations. For example, in operations 330-350, the content notification system 22 may determine the presentation parameters, determine the content parameters, and select a motion-based display animation suitable for presentation in a subsequent operation, such as operation 360.

Figure 7:
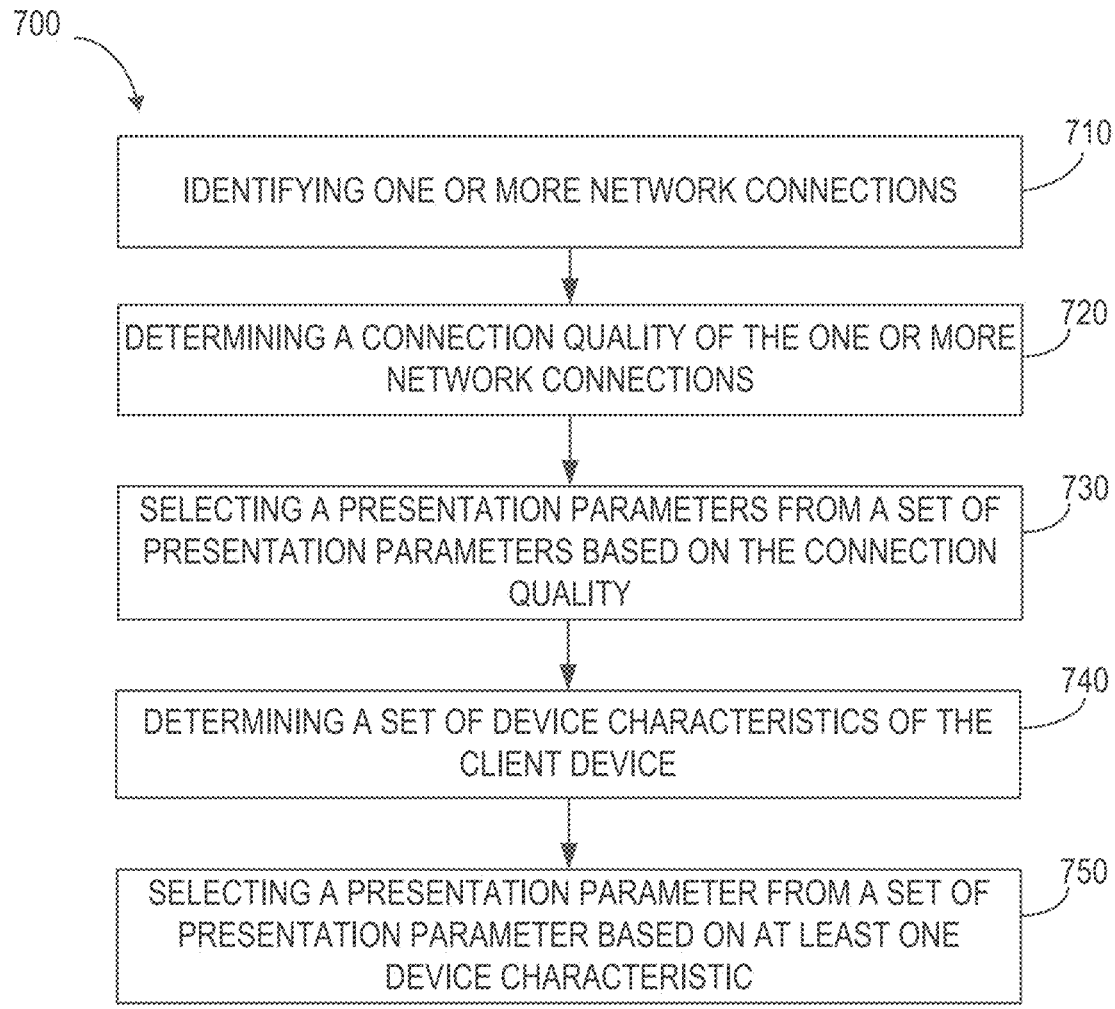
FIG. 7 is a flow diagram illustrating a method of generating real-time unread indicators, according to some embodiments of the present disclosure.

FIG. 7 is a flow diagram illustrating a method 700 of identifying unread elements and presentation context to generate real-time indicators for the unread elements, consistent with various embodiments described herein. The method 700 may be performed, at least in part, by, for example, the content notification system 22 illustrated in FIG. 2 (or an apparatus having similar components, such as one or more client devices 8 or application servers). In some embodiments, the method 700 includes one or more operations from the method 300. As shown in FIG. 7, the method 700 may be performed as one or more sub-operations of the method 300 in operation 330.

In operation 710, the context component 250 identities one or more network connections between the client device and a server storing the content to be presented. The network connections may be identified by transmitting, a signal between the client device and the server. A reply to the signal may indicate connections to networked devices, such as servers, capable of providing or configured to provide information to the client device, such as new content.

In operation 720, the context component 250 determines a connection quality of the one or more network connections. In some embodiments, the connection quality is based on a set of connection quality values. For example, the context component 250 may determine one or more of a connection strength, a bandwidth, a connection stability, or other characteristic of data passing between the client device and the social networking system 10 or the content notification system 22, or one or more networks facilitating passage of the data.

In operation 730, the representation component 230 selects a presentation parameter from a set of presentation parameters based on the connection quality of the one or more network connections. The representation component 230 may select a motion-based display animation, described in more detail below, or other presentation parameter based on the connection quality of the network connection. For example, where the network connection is poor or provides a bandwidth or data throughput rate below a specified threshold, the context component 250 may preclude use of motion-based display animations or specified animations using a relatively high bandwidth or network connection stability. In some instances, presentation of the new content with the animations may be turned off by the context component 250 for a pendency of an unsuitable or unsatisfactory network connection to discourage selection of the new content. In some embodiments, based on the network connection, network connectivity, network stability and data usage, the context component 250 may select additional images or more graphically intensive representations for use in display of the new content items.

In operation 740, the context component 250 determines a set of device characteristics of the client device. The device characteristics may be determined in a manner similar to or the same as that described above in operation 330, with reference to characteristics such as battery power, device capabilities, and other device characteristics.

In operation 750, the representation component 230 selects a presentation parameter from a set of presentation parameters based on at least one device characteristic of the set of device characteristics. The presentation parameter may be selected such that the content representation may be presented within the capabilities of the client device on which the content representation is to be presented. The presentation parameter may be selected in a manner similar to or the same as that described above in the method 300.

Figure 8:
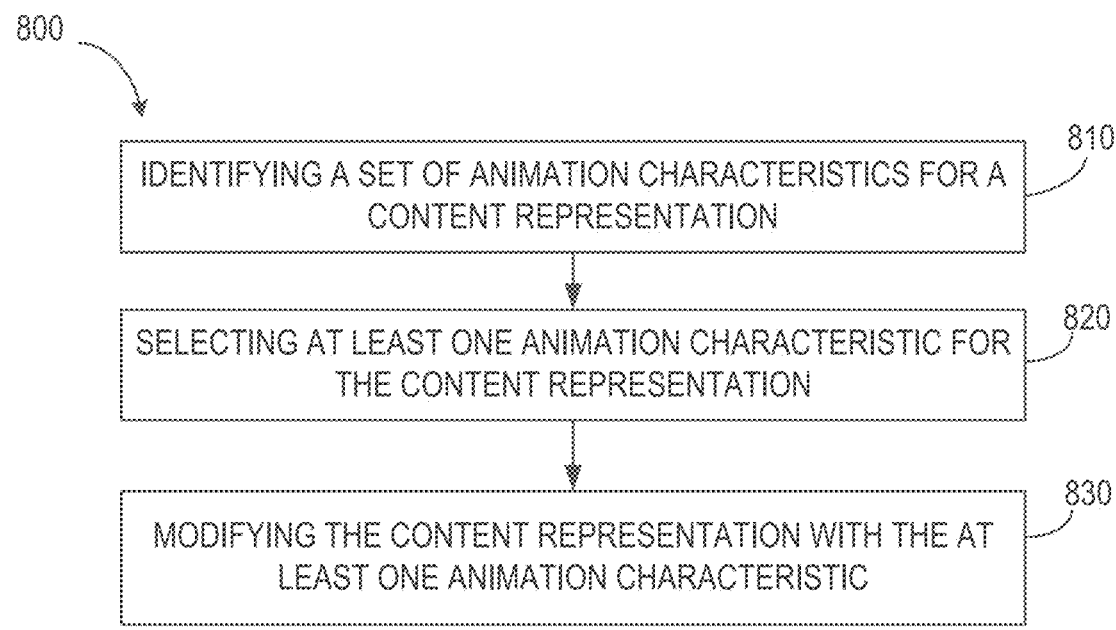
FIG. 8 is a flow diagram illustrating a method of generating real-time unread indicators, according to some embodiments of the present disclosure.

FIG. 8 is a flow diagram illustrating a method 800 of identifying unread elements and presentation context to generate real-time indicators for the unread elements, consistent with various embodiments described herein. The method 800 may be performed, at least in part, by, for example, the content notification system 22 illustrated in FIG. 2 (or an apparatus having similar components, such as one or more client devices 8 or application servers). In some embodiments, the method 800 includes one or more operations from the method 300. As shown in FIG. 8, the method 800 may be performed as one or more sub-operations of the method 300 in operation 350.

In operation 810, the animation component 240 identifies a set of animation characteristics for the content representation. In some embodiments, the animation component 240 may select a motion-based display animation based on a subject, category, or other aspect or characteristic of the new content. In such examples, where a subject of the new content is related to birds, a shuffle, wave, or fluttering may be used, while a pulse animation may be used for music-related content. Although the identification of the animation characteristics is described with specific examples, it should be understood that any suitable animation may be used. Further it should be understood that the animation may be determined to be related to a subject or other characteristic of the content through any suitable manner, such as by matching metadata elements, categories, or any other suitable information.

In some embodiments, the animation component 240 identifies a stop condition for presentation of the representation for the new content. In such instances, upon identifying the stop condition, the animation component 240 ceases at least one aspect of presentation of the representation for the new content. In some instances, the content notification system 22 maintains presentation of at least one representation for the new content while ceasing presentation of a motion-based effect for the at least one representation.

In operation 820, the animation component 240 selects at least one animation characteristic for the content representation. In some embodiments, the at least one animation characteristic is selected based on the one or more presentation parameters and the one or more content parameters.

In some embodiments, the representation comprises a motion-based display indicating a status of the new content as unviewed. The motion-based display may correspond to a set of animation characteristics. In such instances, the motion-based display may be a graphical representation simulating one or more of motion, movement, light effects, color gradations, combinations thereof, or other changes in a graphical display of a user interface element producing or simulating motion within a graphical user interface. For example, motion or movement of one or more user interface elements (e.g., cards, tiles, or images) may be produced or simulated by sequentially adjusting a position, vertical or horizontal alignment, or pixel depiction (e.g., color of a set of pixels) of at least one user interface element of the one or more user interface elements. In instances where the one or more user interface elements art depicted as a plurality of cards, each card may represent a single element or instance of new content. The animation component 240 may produce or simulate motion or movement in the plurality of cards by generating an apparent movement of one or more of the cards. In such instances, a vertical position of two or more of the cards may be temporarily modified sequentially to generate a wave or shuffle-life motion in the plurality of cards. For example, as shown in FIGS. 4A-4D, a relative position of one or more cards may be changed in a vertical direction, in sequence, to imitate or show a shuffling motion for the plurality of cards. The size or orientation of cards may also change to generate a pulse animation. In such instances, the cards may appear to shrink or grow.

Figure 5A:
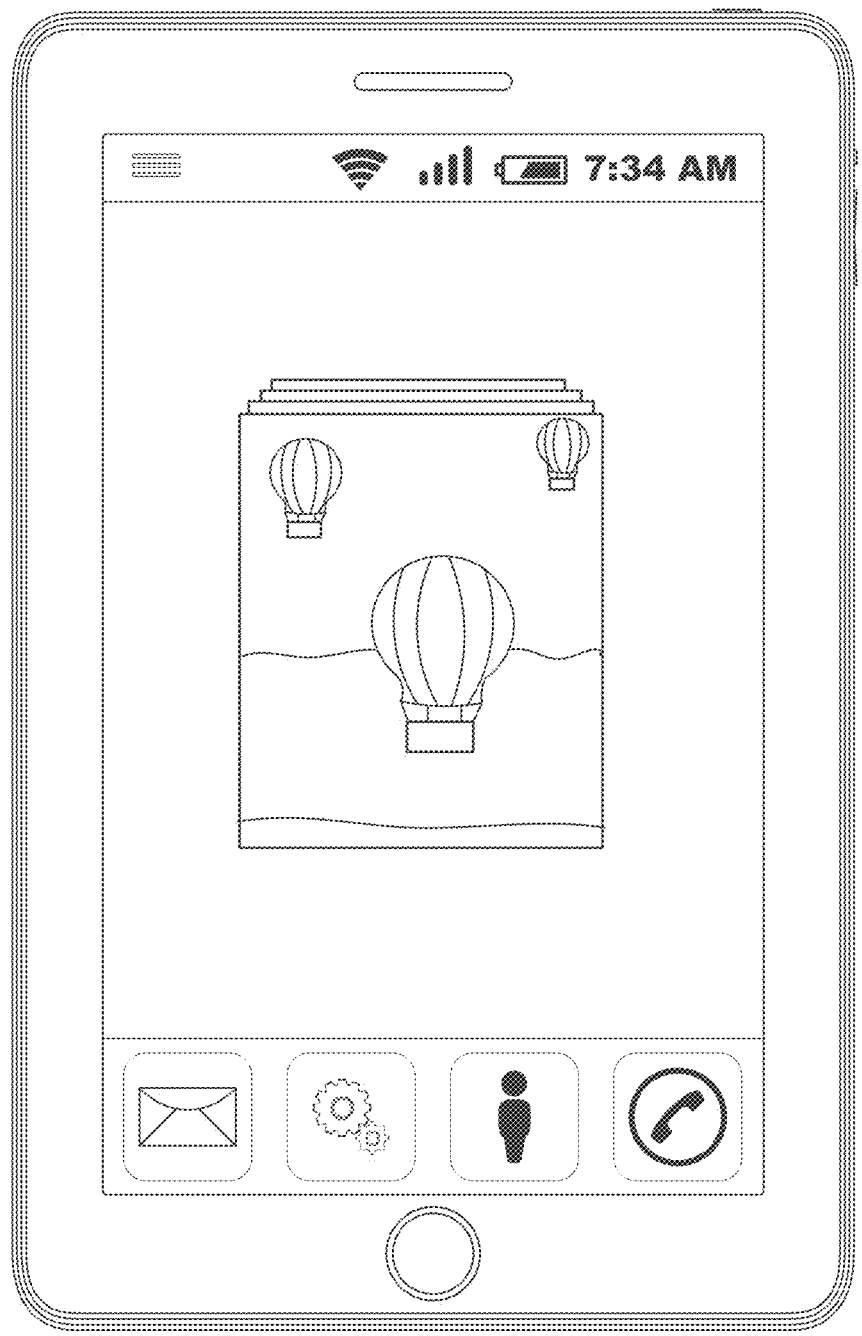
FIG. 5A is a user interface diagram depicting an animation of an unread indicator, according to some example embodiments.
Figure 5B:
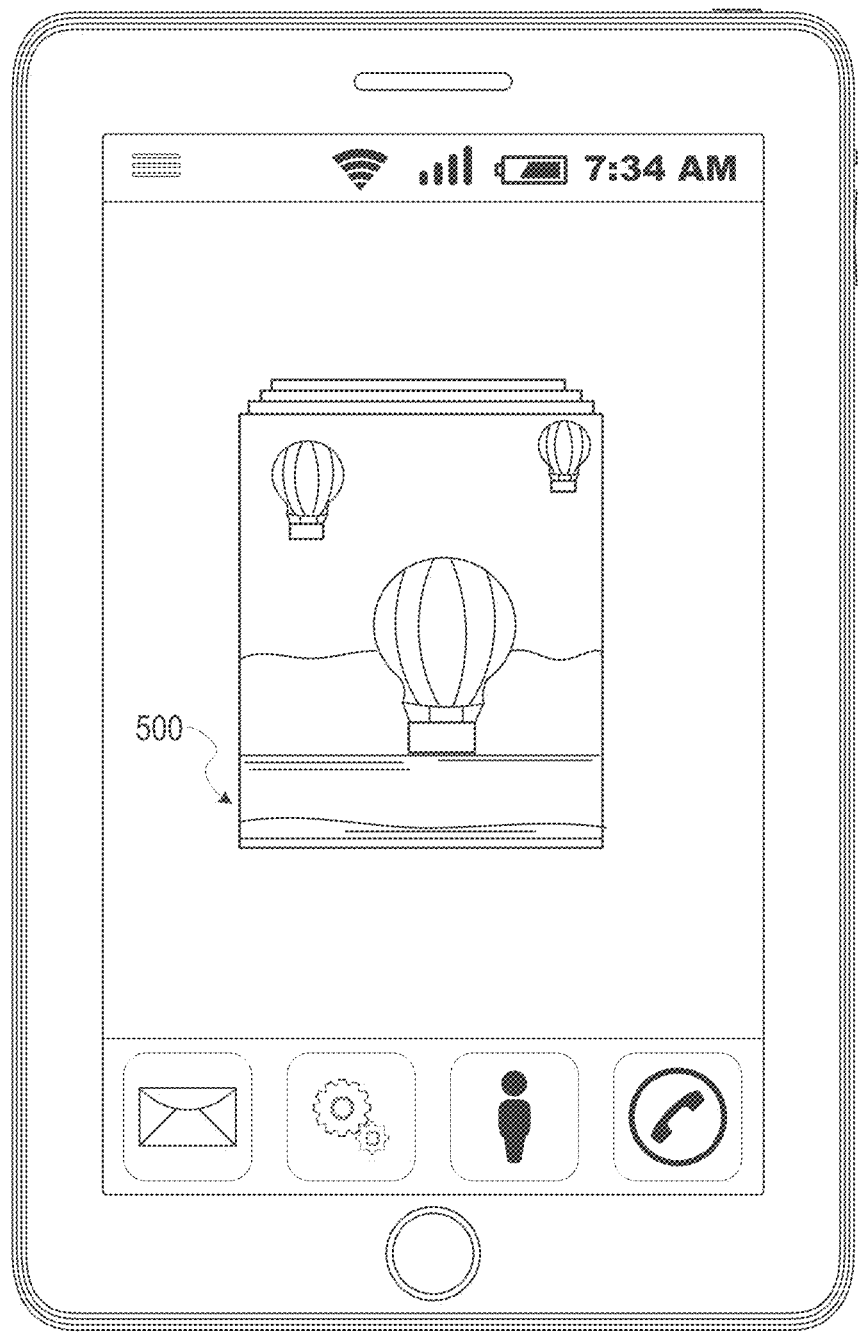
FIG. 5B is a user interface diagram depicting an animation of the unread indicator of FIG. 5A, according to some example embodiments.
Figure 5C:
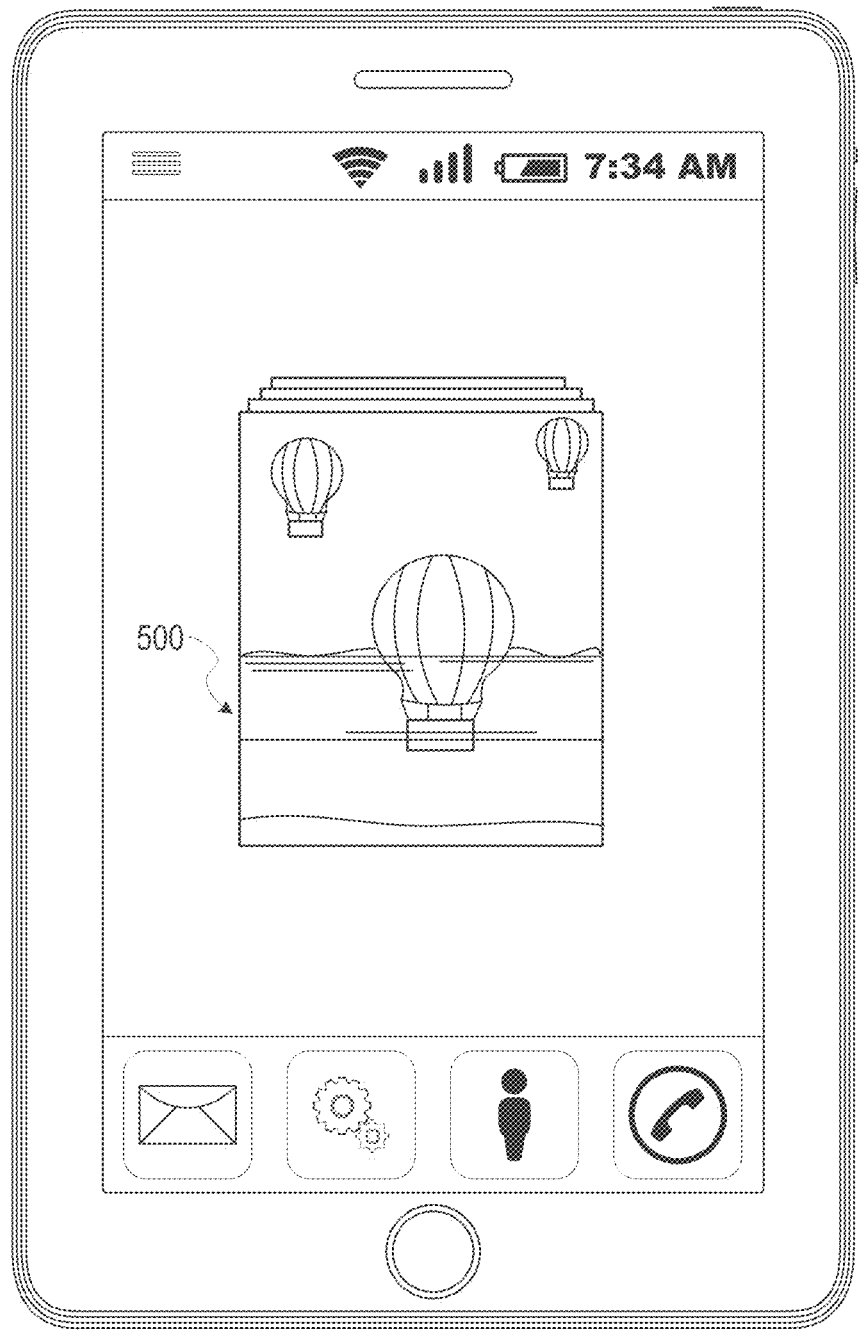
FIG. 5C is a user interface diagram depicting an animation of the unread indicator of FIG. 5A, according to some example embodiments.
Figure 5D:
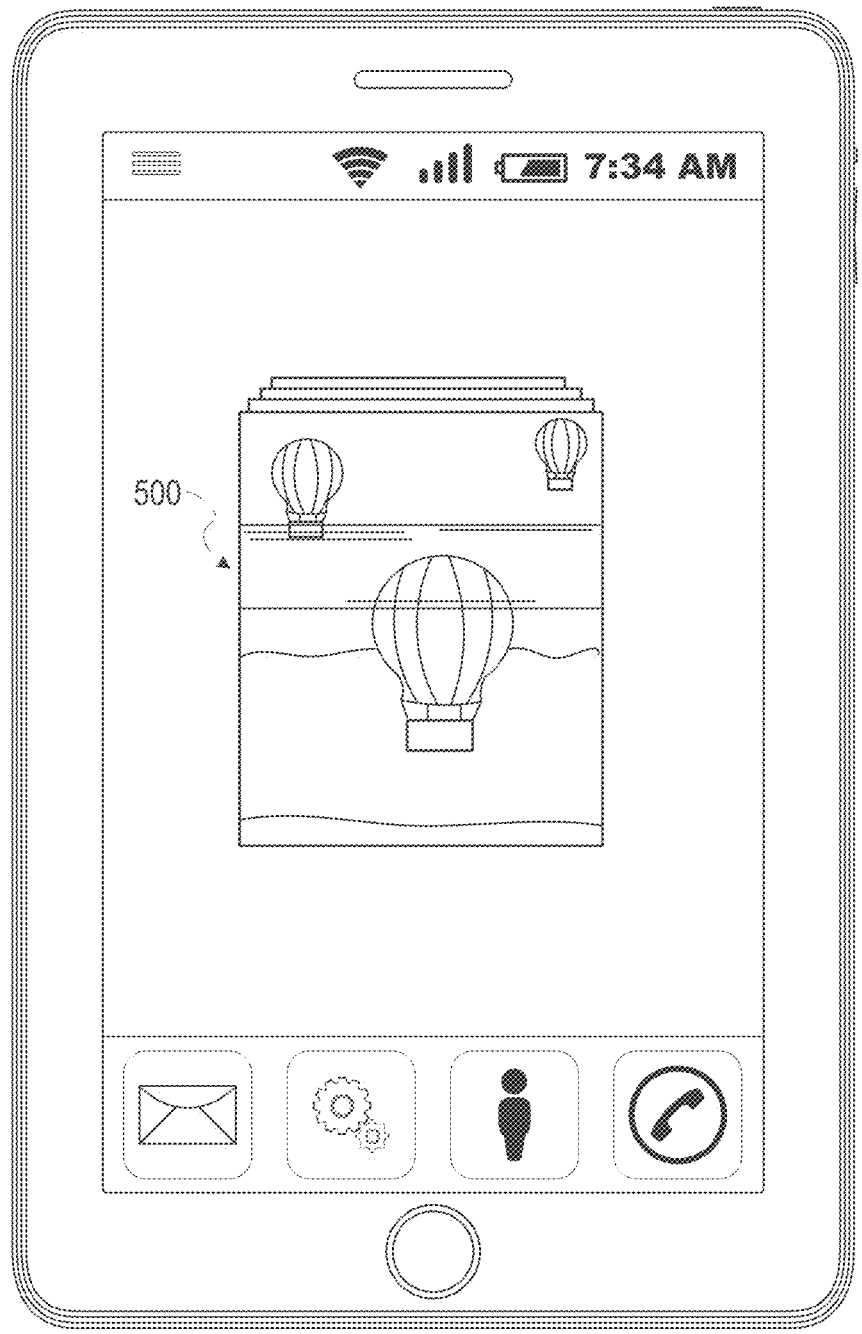
FIG. 5D is a user interface diagram depicting an animation of the unread indicator of FIG. 5A, according to some example embodiments.
Figure 5E:
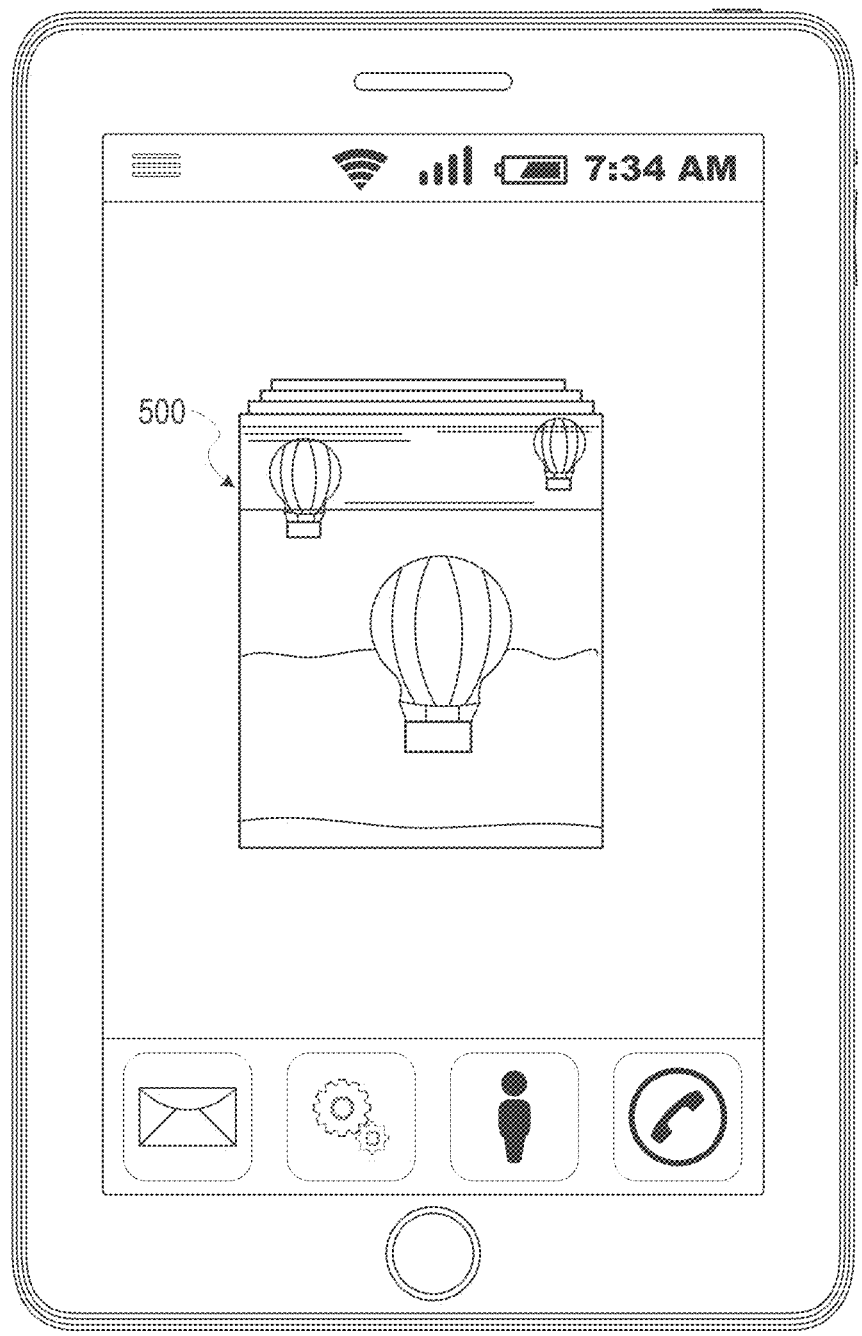
FIG. 5E is a user interface diagram depicting an animation of the unread indicator of FIG. 5A, according to some example embodiments.
Figure 5F:
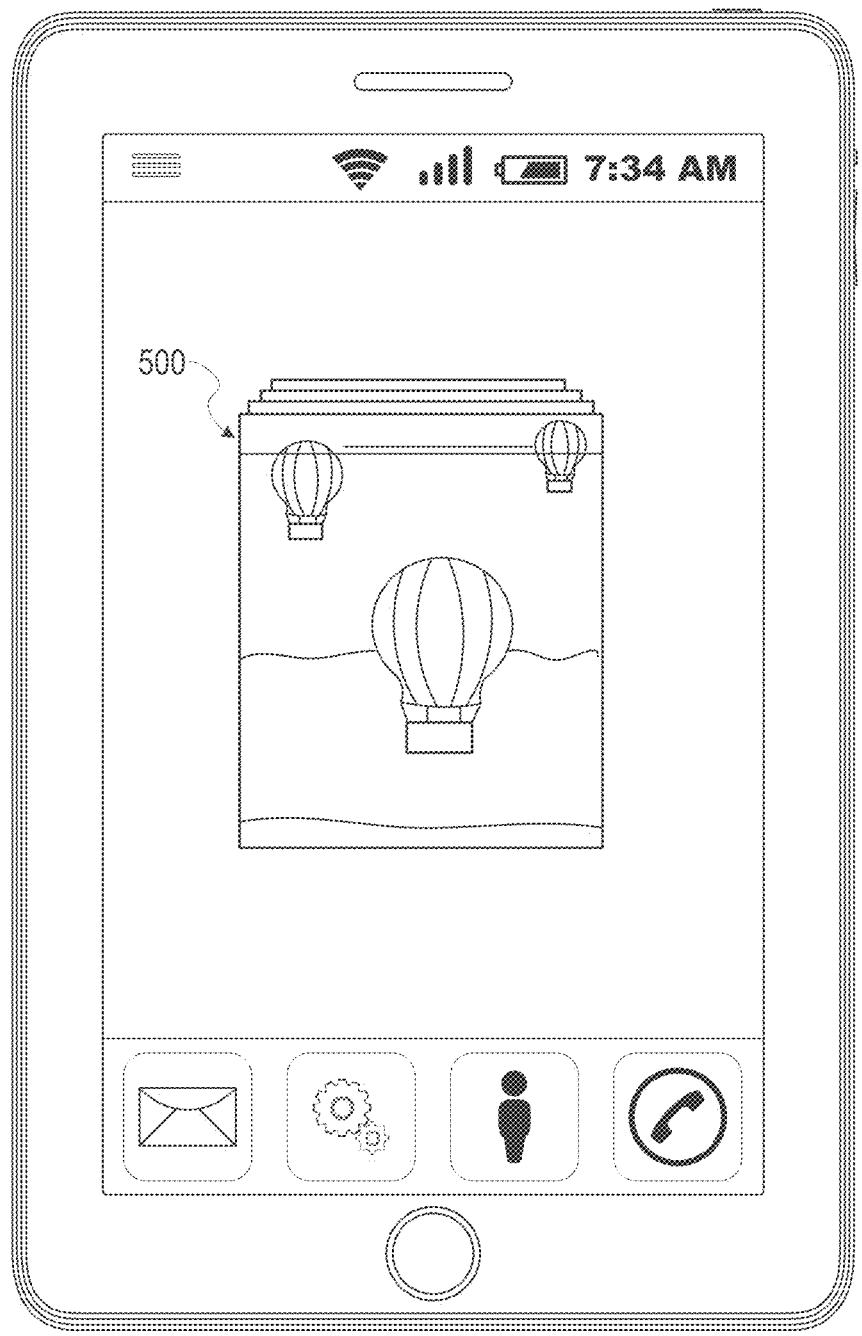
FIG. 5F is a user interface diagram depicting an animation of the unread indicator of FIG. 5A, according to some example embodiments.
Figure 6A:
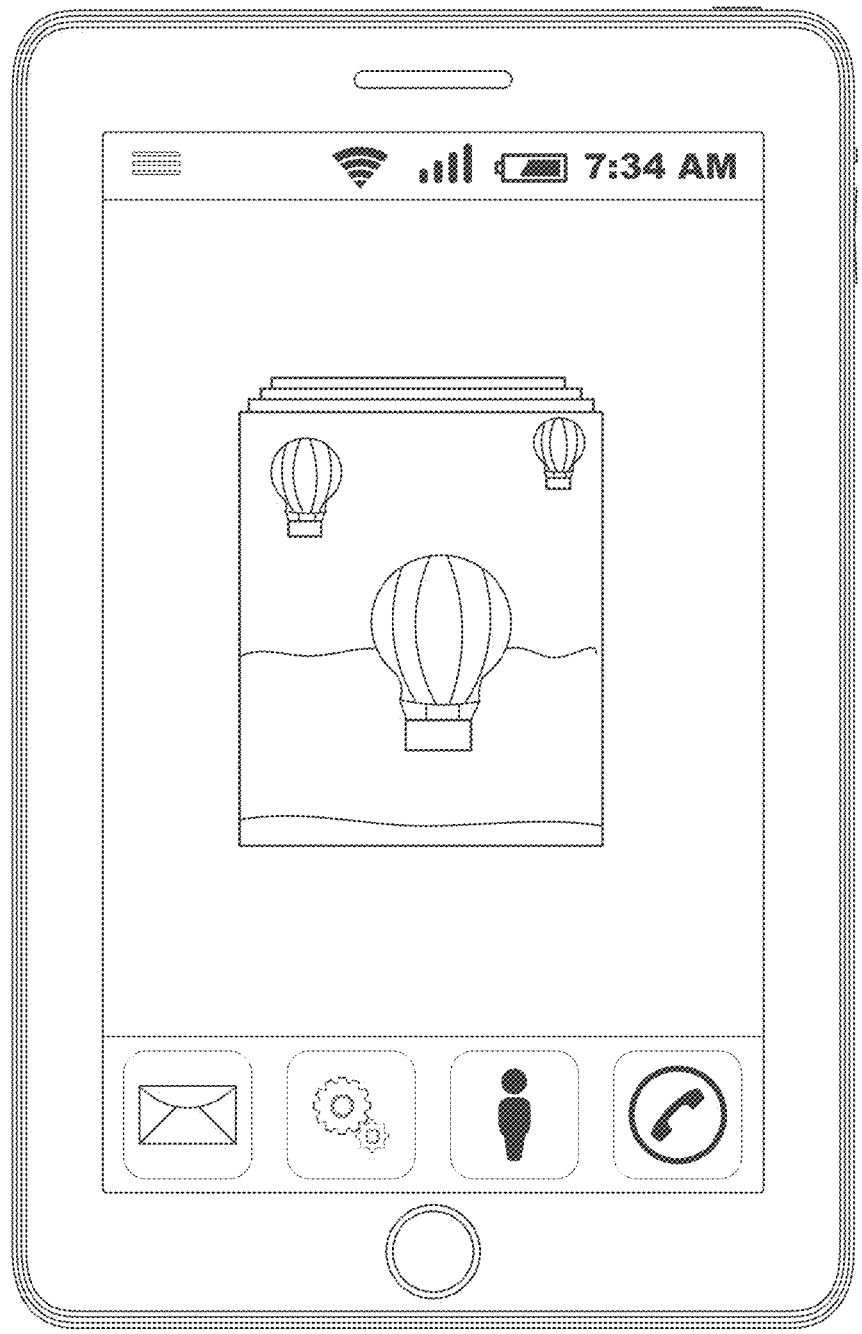
FIG. 6A is a user interface diagram depicting an animation of an unread indicator, according to some example embodiments.
Figure 6B:
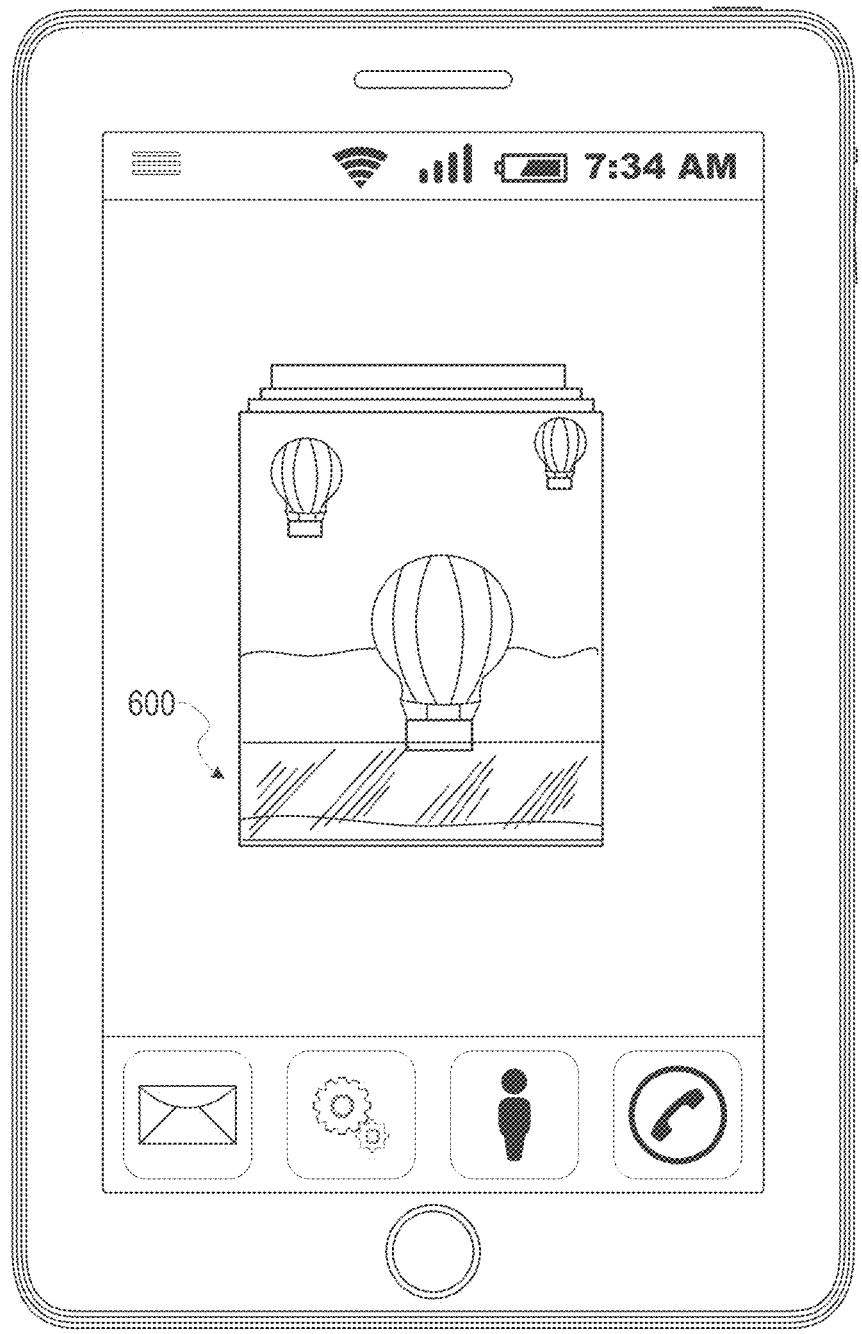
FIG. 6B is a user interface diagram depicting an animation of the unread indicator of FIG. 6A, according to some example embodiments.
Figure 6C:
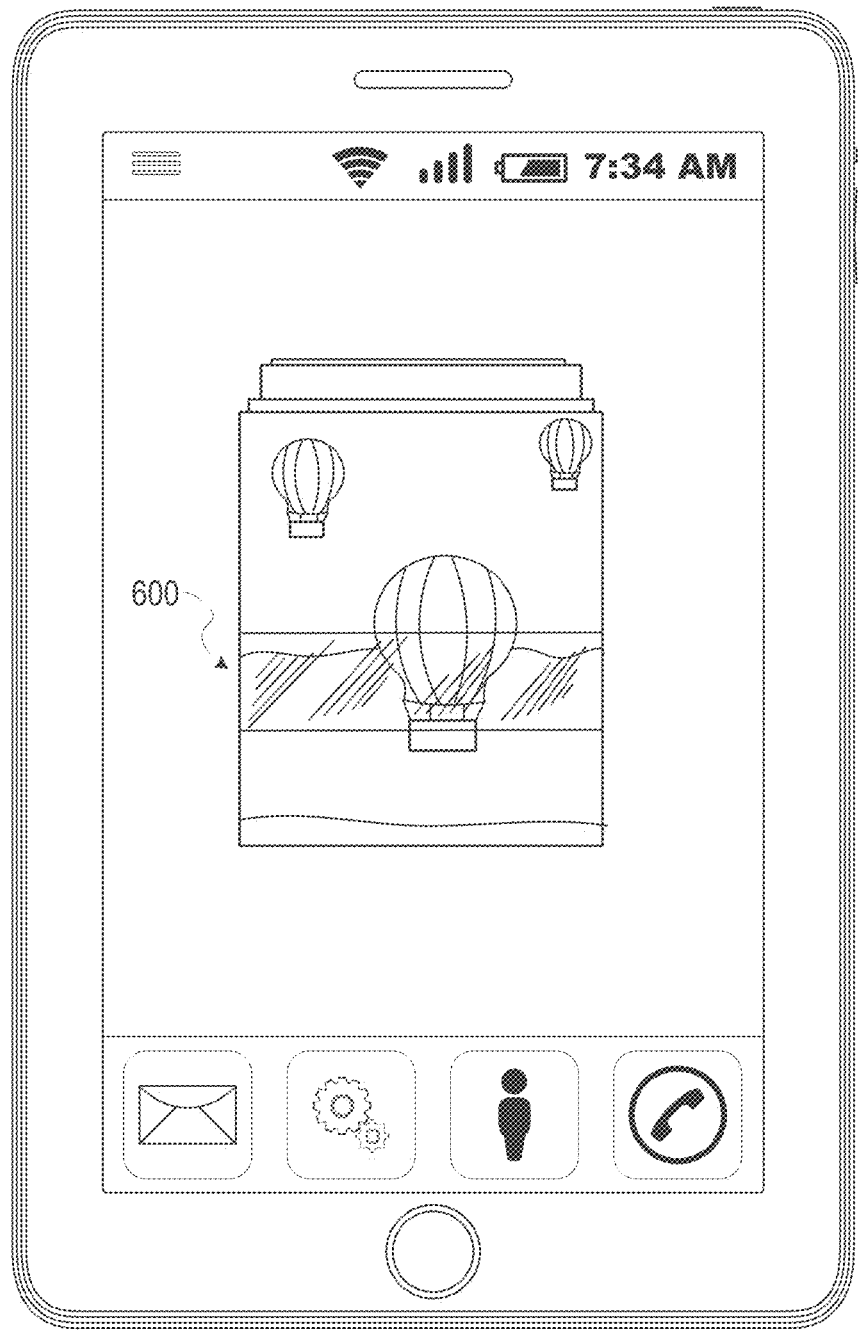
FIG. 6C is a user interface diagram depicting an animation of the unread indicator of FIG. 6A, according to some example embodiments.
Figure 6D:
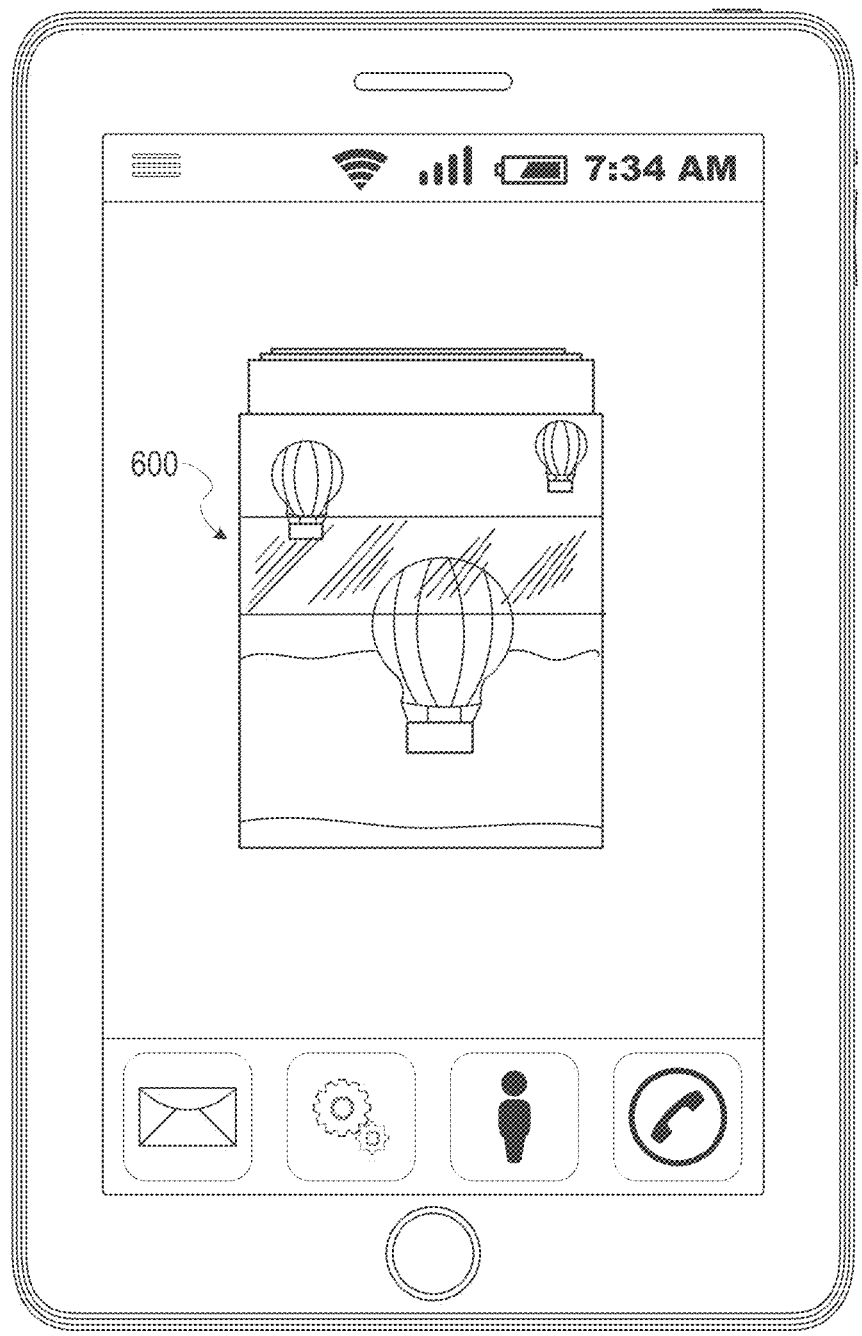
FIG. 6D is a user interface diagram depicting an animation of the unread indicator of FIG. 6A, according to some example embodiments.
Figure 6E:
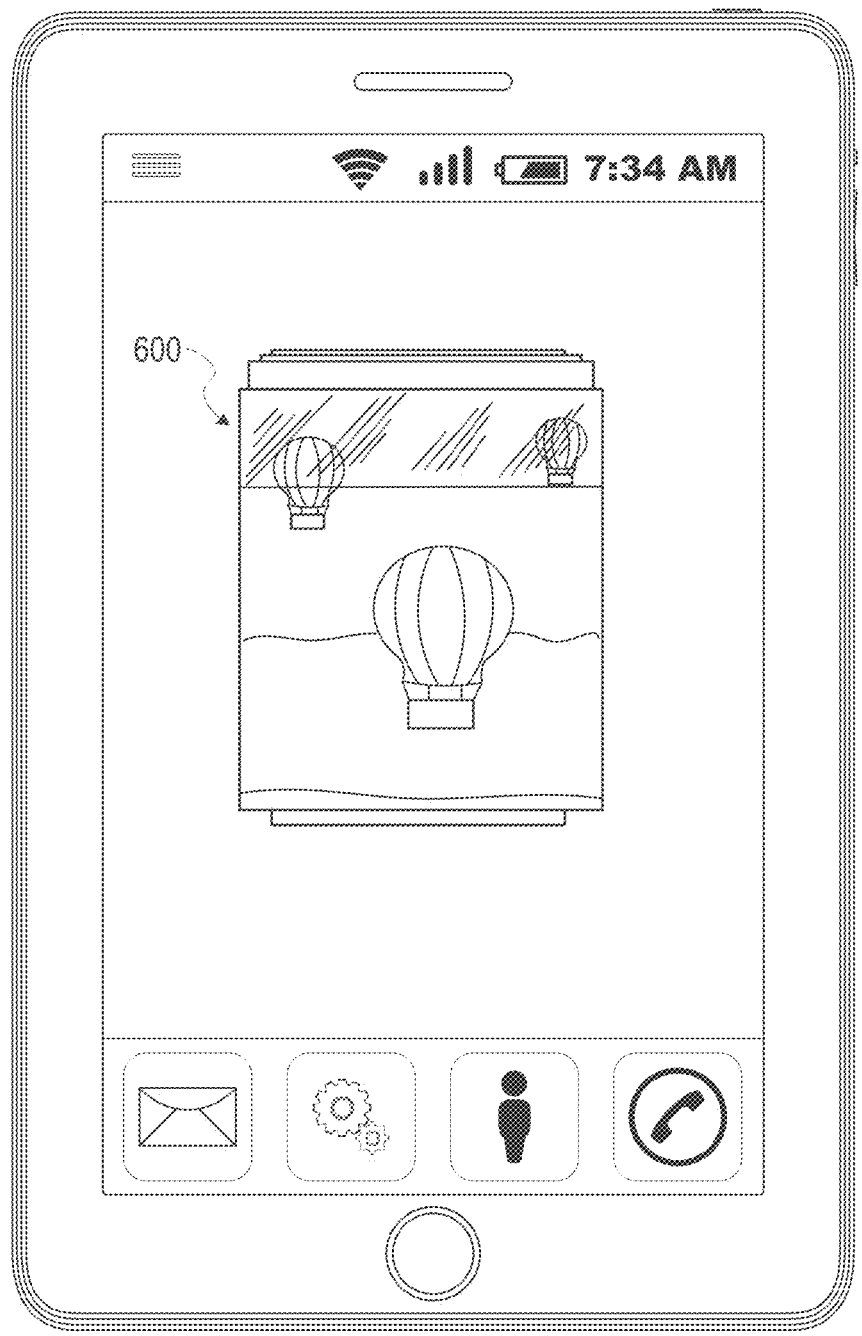
FIG. 6E is a user interface diagram depicting an animation of the unread indicator of FIG. 6A, according to some example embodiments.
Figure 6F:
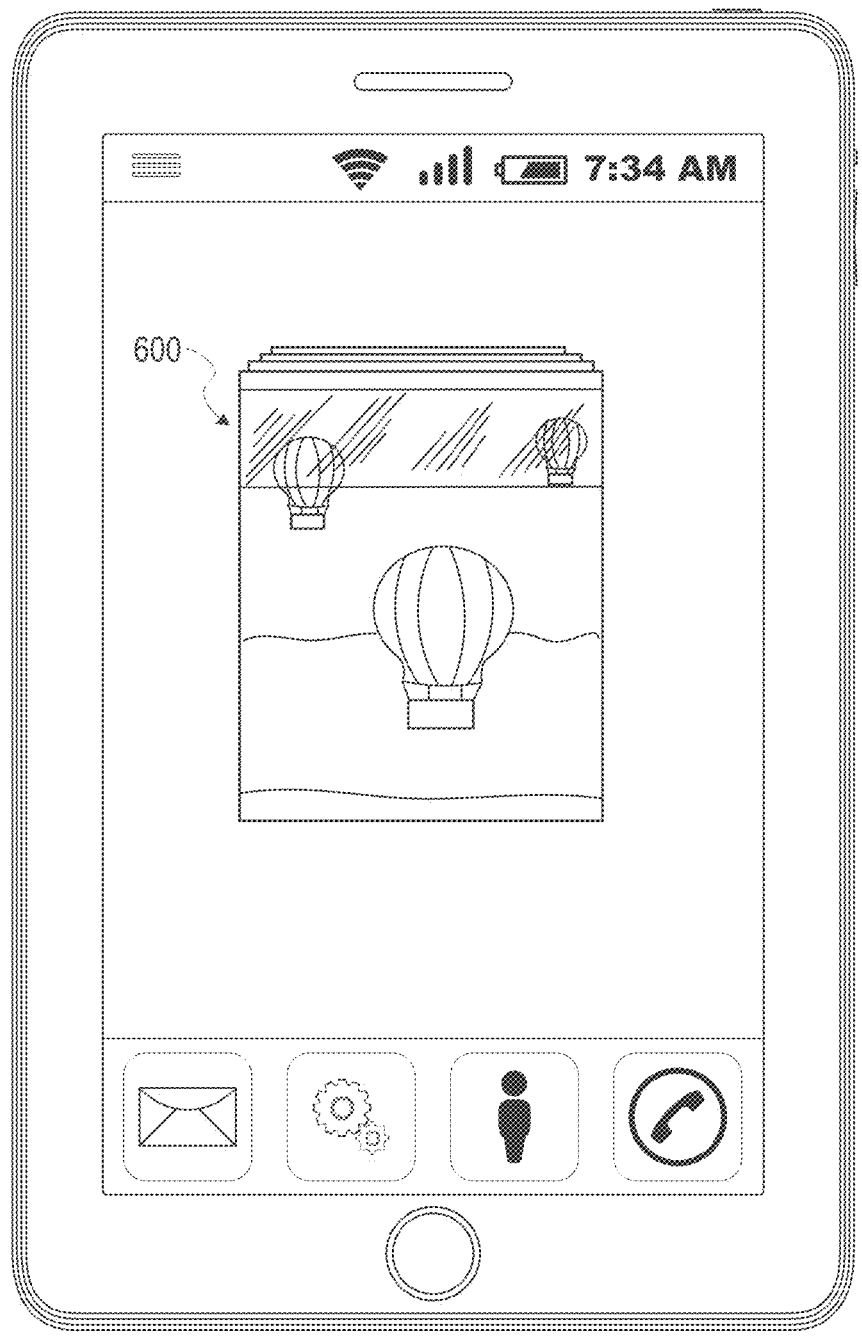
FIG. 6F is a user interface diagram depicting an animation of the unread indicator of FIG. 6A, according to some example embodiments.

In some embodiments, light effects comprise a portion of the set of animation characteristics. The light effects or color gradations may produce variations in color values for individual pixels or sets of pixels to produce a shimmering effect or color fluctuation giving an appearance of movement for one or more cards of the plurality of cards. The shimmer or other variation in color values may cross an entirety of representations of new content items (e.g., across a visible face of a card). For example, as shown in FIGS. 5A-5F, a change 500 in one or more characteristic (e.g., a color value, a saturation value, or a hue value) of pixels depicting the representation may be changed in sequence across the representation. As shown in FIGS. 5A and 5B, the change 500 (e.g., shimmer) in pixel characteristics may be initiated at a first side or portion of the representation, such as a bottom or lower portion of a card. The change 500 may then sequentially travel in a specified direction across the pixels of the representation, as shown in FIGS. 5C-5F.

The shimmer may also cross or move along a portion of the representations of new content items, such as a shimmer across a border or portion of a border of a card. The shimmer may also move in a wave across the face of the card or portion of the card. For example, a color variation (e.g., a lighter color value) may originate at a specified point or points on the card and proceed across the card in a line, in a circle, or in any other suitable path. Color values in front of the color variation have a first value or set of values, and after the color variation (e.g., a lighter colored wave) passes pixels having the first value (e.g., temporarily rendering the pixels in a second value), the pixels revert back from the second value to the first value. Although the representation of new content has been described with respect to cards, it should be understood that the representation of new content may be any representation. For example, the representations may comprise shapes, graphical representations, images, designs, sounds, haptic outputs (e.g., vibrations or vibration patterns), or any other suitable representation.

In some embodiments, the animation component 240 may select a first motion-based display animation for a first set of representations of new content and a second motion-based display animation for a second set of representations of new content. Such selection of two distinct motion-based display animations may occur where the two sets of representations appear next to or proximate to one another. This may have the benefit of visually distinguishing between content representations having different topics, subjects, or other differentiating considerations.

In operation 830, the animation component 240 modifies the content representation with the at least one animation characteristic. In some embodiments, the at least one animation characteristic configures the content representation to display at least one movement of the content representation while the content representation is presented at the client device. The motion-based display animations corresponding to the animation characteristic, as shown in FIGS. 4A-4D (e.g., a shuffle, a shimmer, a light effect, or a color variation), may be produced in accordance with a rhythm, a tempo, a regular rate, or a variable rate. In some instances, the animation component 240 may determine a rhythm presented at the client device (e.g., music playing through headphones or speakers). The animation component 240 may synchronize the animation to the rhythm presented at the client device. The animation component 240 may also present the animation at a rhythm mismatched or contradictory to the audio rhythm of the client device. In some instances, the motion-based display animations may combine two or more effects, such as a shimmer 600 and a shuffle motion, as shown in FIGS. 6A-6F.

In some embodiments, when the animated content representation is presented at the client device, the context component 250 identifies an input at the client device. The animation component 240 determines that the input corresponds to the at least one animation characteristic of the content representation. The presentation component 260 causes the content representation to move according to the at least one animation characteristic. In some embodiments, the content representation is animated when the content representation is presented at the client device, such as when the content representation is depicted on a display device of the client device while the input is detected or subsequent to the input being detected.

The various operations of the example methods described herein may be performed, at least partially, by one or more processors that are temporarily configured (e.g., software instructions) or permanently configured to perform the relevant operations. Whether temporarily or permanently configured, such processors may constitute processor-implemented components or objects that operate to perform one or more operations or functions. The components and objects referred to herein may, in some example embodiments, comprise processor-implemented components and/or objects.

Similarly, the methods described herein may be at least partially processor-implemented. For example, at least some of the operations of a method may be performed by one or more processors or processor-implemented components. The performance of certain operations may be distributed among the one or more processors, not only residing within a single machine or computer, but deployed across a number of machines or computers. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., APIs).

Figure 9:
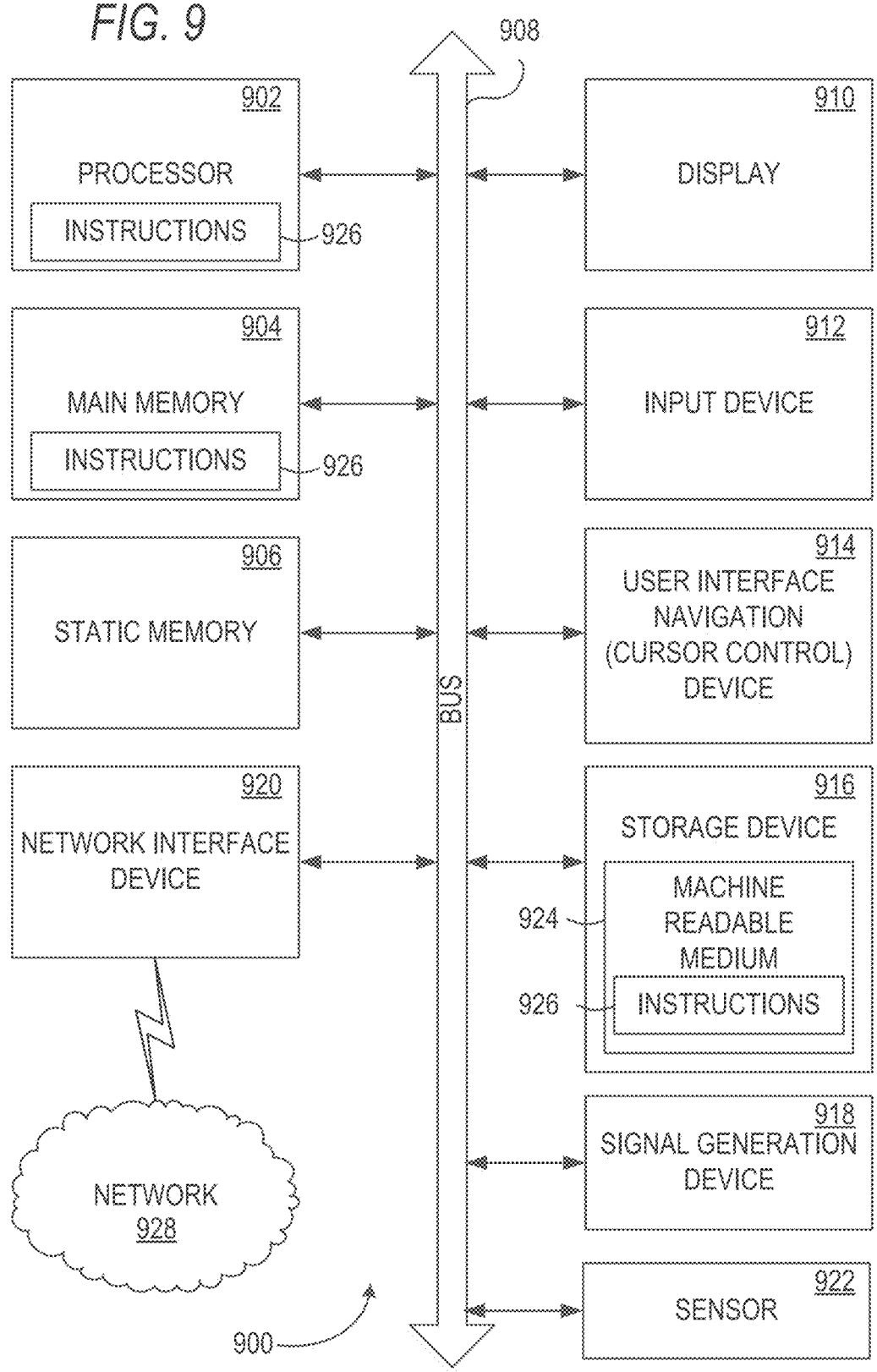
FIG. 9 is a block diagram of a machine in the form of a computing device within which a set of instructions, for causing the machine to perform any one or more of the methodologies discussed herein, may be executed.

FIG. 9 is a block diagram of a machine in the form of a computer system 900 within which a set of instructions, for causing the machine to perform any one or more of the methodologies discussed herein, may be executed. For example, the computer system 900 may be a server functioning as the content notification system 22. In some instances, the computer system 900 may be a set of similar computing devices storing instructions capable of configuring a processor of the computer system 900 as one or more of the components (hardware-software implemented components) described above. The configuration of a component, even for a period of time, causes the computer system 900 to act as a special-purpose computing device for performing one or more operations associated with the component, as described in the present disclosure. In some embodiments, the computer system 900 may function as the social networking system 10 with portions (e.g., hardware and instructions) partitioned to function as one or more of the components, interfaces, or systems described above during specified operations associated with those aspects of the components, interfaces, and systems.

In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In various embodiments, the machine may be a server computer; however, in alternative embodiments, the machine may be a personal computer (PC), a tablet PC, a set-top box (STB), a personal digital assistant (PDA), a mobile telephone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 900 includes a processor 902 (e.g., a central processing unit (CPU), a graphics processing unit (GPU), or both), a main memory 904, and a static memory 906, which communicate with each other via a bus 908. The computer system 900 may further include a display unit 910, an alphanumeric input device 912 (e.g., a keyboard), and a user interface navigation device 914 (e.g., a mouse). In one embodiment, the display unit 910, alphanumeric input device 912, and UI navigation device 914 are a touch screen display. The computer system 900 may additionally include a storage device 916 (e.g., drive unit), a signal generation device 918 (e.g., a speaker), a network interface device 920, and one or more sensors 922, such as a global positioning system sensor, compass, accelerometer, or other sensor.

The storage device 916 includes a machine-readable medium 924 on which is stored one or more sets of instructions 926 and data structures embodying or utilized by any one or more of the methodologies or functions described herein. The instructions 926 (e.g., processor-executable instructions) may also reside, completely or at least partially, within the main memory 904 (e.g., non-transitory machine-readable storage medium or processor-readable storage device) and/or within the processor 902 during execution thereof by the computer system 900, with the main memory 904 and the processor 902 also constituting machine-readable media 924.

While the machine-readable medium 924 is illustrated in an example embodiment to be a single medium, the term "machine-readable medium" may include a single medium or multiple media (e.g., a centralized or distributed database, and/or associated caches and servers) that store the one or more instructions 926 (e.g., processor executable instructions). The terms "machine-readable medium" and "processor-readable storage device" shall also be taken to include any tangible medium that is capable of storing, encoding, or carrying the instructions 926 for execution by the machine and that cause the machine to perform any one or more of the methodologies of the present disclosure, or that is capable of storing, encoding, or carrying data structures utilized by or associated with such instructions 926. The term "machine-readable medium" shall accordingly be taken to include, but not be limited to, solid-state memories, and optical and magnetic media. Specific examples of machine-readable media 924 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disk read only memory (CD-ROM) and digital video disk read only memory (DVD-ROM) disks.

The instructions 926 may further be transmitted or received over a communication network 928 using a transmission medium via the network interface device 920 utilizing any one of a number of well-known transfer protocols (e.g., HTTP). Examples of communication networks include a local area network (LAN) a wide area network (WAN), the Internet, mobile telephone networks, plain old telephone (POTS) networks, and wireless data networks (e.g., Wi-Fi and WiMax® networks). The term "transmission medium" shall be taken to include any intangible medium that is capable of storing, encoding, or carrying the instructions 926 for execution by the machine, and includes digital or analog communications signals or other intangible media to facilitate communication of such software.

Although embodiments have been described with reference to specific examples, it will be evident that various modifications and changes may be made to these embodiments without departing from the broader scope of the inventive concepts of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
receiving an indication identifying a member of a social networking system, the indication further identifying a client device associated with the member;
identifying, using one or more hardware processors, content hosted by the social networking system for presentation to the member, the content being previously unviewed by the member;
determining one or more presentation parameters associated with a presentation context for presenting the content to the member;
determining one or more content parameters associated with the content to be presented to the member, wherein at least one content parameter is a content characteristic indicating a relationship between the content previously unviewed by the member and other content previously viewed by the member;
selecting a motion-based animation from a plurality of motion-based animations based on the one or more content parameters associated with the content to be presented to the member the motion-based animation selected to indicate a subject or category of the content previously unviewed by the member;
generating a content representation of the content for presentation within a user interface, the content representation including the motion-based animation representing the content previously unviewed by the member, the generating of the content representation being based on the one or more presentation parameters and the one or more content parameters;
modifying the generated content presentation, wherein modifying the content representation comprises:
based on the one or more presentation parameters and the one or more content parameters, selecting at least one animation characteristic from a set of animation characteristics for the content representation; and modifying the content representation with the at least one animation characteristic, the at least one animation characteristic configuring the content representation to display at least one movement of the content representation while the content representation is presented at the client device; and causing presentation of the modified content representation including the motion-based animation at the client device associated with the member, wherein the presentation of the modified content representation including the motion-based animation is an indication of availability of new content hosted by the social networking system.

2. The method of claim 1, wherein identifying the content for presentation further comprises:

identifying a first set of content presented at the client device at a first time;

identifying a second set of content available for presentation at the client device after the first time; and selecting a portion of content of the second set of content as the content for presentation to the member, the portion of content corresponding to the first set of content.

3. The method of claim 1, wherein determining the one or more presentation parameters further comprises:

identifying one or more network connections between the client device and a server storing the content to be presented;

determining a connection quality of the one or more network connections, the connection quality based on a set of connection quality values; and selecting a presentation parameter from a set of presentation parameters based on the connection quality of the one or more network connections.

4. The method of claim 1, wherein determining the one or more presentation parameters further comprises:

determining a set of device characteristics of the client device; and selecting a presentation parameter from a set of presentation parameters based on at least one device characteristic of the set of device characteristics.

5. The method of claim 1, wherein determining the one or more content parameters further comprises:

identifying a set of content characteristics for the content to be presented at the client device; and selecting at least one content parameter from a set of content parameters based on at least one content characteristic of the set of content characteristics.

6. The method of claim 1, wherein the content representation includes at least one animation characteristic configuring the content representation to perform at least one movement, and wherein causing presentation of the content representation at the client device further comprises:

identifying an input at the client device;

determining the input corresponds to the at least one animation characteristic of the content representation; and while the content representation is presented at the client device, causing the content representation to move according to the at least one animation characteristic.

7. A system comprising:

one or more hardware processors; and a non-transitory machine-readable medium for storing instructions that, when executed by the one or more hardware processors, cause the one or more hardware processors to perform operations comprising:

receiving an indication identifying a member of a social networking system, the indication further identifying a client device associated with the member;

identifying content hosted by the social networking system for presentation to the member, the content being previously unviewed by the member;

determining one or more presentation parameters associated with a presentation context for presenting the content to the member;

determining one or more content parameters associated with the content to be presented to the member, wherein at least one content parameter is a content characteristic indicating a relationship between the content previously unviewed by the member and other content previously viewed by the member;

selecting a motion-based animation from a plurality of motion-based animations based on the one or more content parameters associated with the content to be presented to the member the motion-based animation selected to indicate a subject or category of the content previously unviewed by the member;

generating a content representation of the content for presentation within a user interface, the content representation including the motion-based animation representing the content previously unviewed by the member, the generating of the content representation being based on the one or more presentation parameters and the one or more content parameters;

modifying the generated content representation, wherein modifying the content representation further comprises:

based on the one or more presentation parameters and the one or more content parameters, selecting at least one animation characteristic from a set of animation characteristics for the content representation; and modifying the content representation with the at least one animation characteristic, the at least one animation characteristic configuring the content representation to display at least one movement of the content representation while the content representation is presented at the client device; and causing presentation of the modified content representation including the motion-based animation at the client device associated with the member, wherein the presentation of the modified content representation including the motion-based animation is an indication of availability of new content hosted by the social networking system.

8. The system of claim 7, wherein identifying the content for presentation further comprises:

identifying a first set of content presented at the client device at a first time;

identifying a second set of content available for presentation at the client device after the first time; and selecting a portion of content of the second set of content as the content for presentation to the member, the portion of content corresponding to the first set of content.

9. The system of claim 7, wherein determining the one or more presentation parameters further comprises:

identifying one or more network connections between the client device and a server storing the content to be presented;

determining a connection quality of the one or more network connections, the connection quality based on a set of connection quality values; and selecting a presentation parameter from a set of presentation parameters based on the connection quality of the one or more network connections.

10. The system of claim 7, wherein determining the one or more presentation parameters further comprises:

determining a set of device characteristics of the client device; and selecting a presentation parameter from a set of presentation parameters based on at least one device characteristic of the set of device characteristics.

11. The system of claim 7, wherein determining the one or more content parameters further comprises:

identifying a set of content characteristics for the content to be presented at the client device; and selecting at least one content parameter from a set of content parameters based on at least one content characteristic of the set of content characteristics.

12. The system of claim 7, wherein the content representation includes at least one animation characteristic configuring the content representation to perform at least one movement, and wherein causing presentation of the content representation at the client device further comprises:

identifying an input at the client device;

determining the input corresponds to the at least one animation characteristic of the content representation; and while the content representation is presented at the client device, causing the content representation to move according to the at least one animation characteristic.

13. A non-transitory machine-readable medium storing instructions that, when executed by one or more hardware processors of a machine, cause the machine to perform operations comprising:

receiving an indication identifying a member of a social networking system, the indication further identifying a client device associated with the member;

identifying content hosted by the social networking system for presentation to the member, the content being previously unviewed by the member;

determining one or more presentation parameters associated with a presentation context for presenting the content to the member;

determining one or more content parameters associated with the content to be presented to the member, wherein at least one content parameter is a content characteristic indicating a relationship between the content previously unviewed by the member and other content previously viewed by the member;

selecting a motion-based animation from a plurality of motion-based animations based on the one or more content parameters associated with the content to be presented to the member, the motion-based animation selected to indicate a subject or category of the content previously unviewed by the member;

generating a content representation of the content for presentation within a user interface, the content representation including the motion-based animation representing the content previously unviewed by the member, the generating of the content representation being based on the one or more presentation parameters and the one or more content parameters;

modifying the generated content presentation, wherein modifying the content representation further comprises:

based on the one or more presentation parameters and the one or more content parameters, selecting at least one animation characteristic from a set of animation characteristics for the content representation; and modifying the content representation with the at least one animation characteristic, the at least one animation characteristic configuring the content representation to display at least one movement of the content representation while the content representation is presented at the client device; and causing presentation of the modified content representation including the motion-based animation at the client device associated with the member, wherein the presentation of the modified content representation including the motion-based animation is an indication of availability of new content hosted by the social networking system.

14. The non-transitory machine-readable medium of claim 13, wherein identifying the content for presentation further comprises:

identifying a first set of content presented at the client device at a first time;

identifying a second set of content available for presentation at the client device after the first time; and selecting a portion of content of the second set of content as the content for presentation to the member, the portion of content corresponding to the first set of content.

15. The non-transitory machine-readable medium of claim 13, wherein determining the one or more presentation parameters further comprises:

identifying one or more network connections between the client device and a server storing the content to be presented;

determining a connection quality of the one or more network connections, the connection quality based on a set of connection quality values; and selecting a presentation parameter from a set of presentation parameters based on the connection quality of the one or more network connections.

16. The non-transitory machine-readable medium of claim 13, wherein determining the one or more presentation parameters further comprises:

determining a set of device characteristics of the client device; and selecting a presentation parameter from a set of presentation parameters based on at least one device characteristic of the set of device characteristics.

17. The non-transitory machine-readable medium of claim 13, wherein determining the one or more content parameters further comprises:

identifying a set of content characteristics for the content to be presented at the client device; and selecting at least one content parameter from a set of content parameters based on at least one content characteristic of the set of content characteristics.

18. The method of claim 1, wherein the set of animation characteristics for the content representation include: a shimmer animation, a shuffle animation, a light effect, or a color variation.

19. The method of claim 1, wherein determining one or more content parameters associated with the content to be presented to the member includes determining one or more colors depicted in an image associated with the content and the content representation is generated to include the one or more colors depicted in the image.

* * * * *